US011879446B2

(12) United States Patent
Kim et al.

(10) Patent No.: US 11,879,446 B2
(45) Date of Patent: Jan. 23, 2024

(54) COMPRESSOR

(71) Applicant: LG Electronics Inc., Seoul (KR)

(72) Inventors: Kwangwook Kim, Seoul (KR); Hyeongjun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/710,200

(22) Filed: Mar. 31, 2022

(65) Prior Publication Data

US 2022/0389919 A1 Dec. 8, 2022

(30) Foreign Application Priority Data

Jun. 4, 2021 (KR) ........................ 10-2021-0072999

(51) Int. Cl.
*F04B 35/04* (2006.01)
*F04B 39/12* (2006.01)
(Continued)

(52) U.S. Cl.
CPC .......... *F04B 35/045* (2013.01); *F04B 39/121* (2013.01); *F04B 39/122* (2013.01); *F04B 39/127* (2013.01); *F04B 39/0044* (2013.01); *F04B 53/003* (2013.01); *F04B 53/162* (2013.01); *F05B 2260/96* (2013.01)

(58) Field of Classification Search
CPC .... F04B 35/045; F04B 39/121; F04B 39/122; F04B 39/127; F04B 39/0044; F04B 53/003; F04B 53/162; F05B 2260/96
See application file for complete search history.

(56) References Cited

U.S. PATENT DOCUMENTS

2012/0251357 A1* 10/2012 Yokoi ..................... F04B 53/16 417/410.1
2019/0093645 A1* 3/2019 Lee ....................... F04B 35/045
2020/0318622 A1* 10/2020 Park ...................... F04B 39/121

FOREIGN PATENT DOCUMENTS

GB 892694 * 3/1962 ............ F04B 39/127
GB 958199 * 5/1964 ............ F04B 39/127
(Continued)

OTHER PUBLICATIONS

Extended European Search Report in European Appln. No. 22163823.2, dated Aug. 30, 2022, 7 pages.
(Continued)

*Primary Examiner* — Kenneth J Hansen
*Assistant Examiner* — David N Brandt
(74) *Attorney, Agent, or Firm* — Fish & Richardson P.C.

(57) ABSTRACT

A compressor includes a case, a compression unit having a cylinder, a piston disposed inside the cylinder, and a driving unit for reciprocating the piston, and a support unit elastically supporting the compression unit to be spaced apart from an inner surface of the case. The support unit includes a wire spring having a plurality of linear portions arranged in parallel with one another and curved portions each connecting two adjacent linear portions. The wire spring includes a first wire spring and a second wire spring symmetrically disposed with each other. The wire spring includes a connecting portion connecting the first wire spring and the second wire spring, and the connecting portion is supported by the case. Accordingly, a simplified structure can be obtained and a manufacturing cost can be reduced.

19 Claims, 19 Drawing Sheets

(51) Int. Cl.

| | |
|---|---|
| ***F04B 39/00*** | (2006.01) |
| ***F04B 53/00*** | (2006.01) |
| ***F04B 53/16*** | (2006.01) |

(56) References Cited

FOREIGN PATENT DOCUMENTS

| | | |
|---|---|---|
| KR | 10-1991-0003266 | 2/1991 |
| KR | 10-2005-0080657 | 8/2005 |
| KR | 20190030056 | 3/2019 |
| KR | 101990136 | 9/2019 |
| KR | 10-2020-0008711 | 1/2020 |
| WO | WO2019034366 | 2/2019 |

OTHER PUBLICATIONS

Office Action in Korean Appln. No. 10-2021-0072999, dated May 30, 2023, 12 pages (with English translation).

* cited by examiner

COMPRESSOR

CROSS-REFERENCE TO RELATED APPLICATION

Pursuant to 35 U.S.C. § 119(a), this application claims the benefit of the earlier filing date and the right of priority to Korean Patent Application No. 10-2021-0072999, filed on Jun. 4, 2021, the contents of which is incorporated by reference herein in its entirety.

TECHNICAL FIELD

The present disclosure relates to a compressor.

BACKGROUND

As is well known, a compressor is an apparatus that receives power from a power generating device such as a motor or a turbine and compresses a working fluid such as air or refrigerant (refrigerant gas). In detail, compressors are widely applied to industrial fields and household appliances, particularly, steam compression refrigeration cycles (hereinafter, referred to as 'refrigeration cycles'), and the like.

These compressors may be classified into a reciprocating compressor, a rotary compressor, and a scroll compressor according to a method of compressing refrigerant.

Such a compressor generally includes a shell or case (hereinafter, referred to as 'case') defining a hermetic space, and a compression unit provided inside the case to compress refrigerant.

The compression unit includes a cylinder defining a compression space for the refrigerant, a piston having one end portion disposed inside the cylinder, and a driving unit for driving the piston to reciprocate relative to the cylinder in an axial direction.

The driving unit may include a stator and a mover reciprocating relative to the stator in the axial direction.

The compression unit is spaced apart from an inner surface of the case, and supported by an elastic support portion so that vibration generated during operation can be suppressed from being transmitted to the case.

Meanwhile, in the related art compressor, since the piston and the mover are operating in the axial direction, it is required to reduce radial displacement of the compression unit, that is, lateral displacement.

Among these related art compressors, Korean Registration Publication No. 10-1990136 (Jun. 11, 2019) which has been filed by the applicant of the present disclosure discloses a compressor having a leaf spring capable of increasing rigidity in a radial direction to reduce lateral displacement.

However, in the compressor having the leaf spring, the leaf spring includes a body formed in a plate shape, and a plurality of elastically-deformable portions spirally extending toward the body from the body. This structure is complicated and requires a lot of manufacturing cost and efforts. For reference, the manufacturing cost of the leaf spring is increased by approximately 10 to 20 times compared to a manufacturing cost of a support system having a typical compression coil spring.

In addition, the leaf spring supporting a rear end portion of the compression unit is provided with a suction pipe formed in a center such that refrigerant is suctioned. A plurality of elastic support portions is formed spirally around the suction pipe. This may cause an increase in size of the leaf spring in the radial direction to that extent.

The suction pipe extends in the axial direction to be coupled to a rear end portion of the case, and the plurality of elastically-deformable portions of the leaf spring is coupled to a periphery of the suction pipe. This structure requires a relatively large installation space and thereby causes an increase in an axial length of the compressor to that much.

A front elastic support portion supporting a front end portion of the compression unit in the axial direction is supported by a cylindrical portion of the case, and a rear elastic support portion supporting a rear end portion of the compression unit is supported by the suction pipe connected to a center of the rear end portion of the case. With the structure, when the piston reciprocates (vibrates) in the axial direction in response to the operation of the compression unit, a rotation moment may be generated to rotate the case, which causes vibration and impact to be kept applied to legs (especially, rear legs) supporting the compression unit in an up and down direction. The vibration is transferred to an object on which the compressor is installed to be supported, for example, to a bottom surface of a machine room of a refrigerator, thereby causing vibration noise.

PRIOR ART DOCUMENT

Patent Document (Patent Document 1) KR 10-1990136 B1

SUMMARY

Therefore, an aspect of the present disclosure is to provide a compressor having an elastic support portion which has a simple structure and can reduce a manufacturing cost.

Another aspect of the present disclosure is to provide a compressor capable of suppressing an occurrence of vibration of a case by minimizing a rotation moment transferred to the case during an operation of a piston.

Still another aspect of the present disclosure is to provide a compressor capable of shortening an axial length.

A compressor according to the present disclosure for achieving those aspects and other advantages according to an implementation may be characterized by including a wire spring having a plurality of linear portions and curved portions each connecting two adjacent linear portions.

Specifically, the compressor may include a case, a compression unit disposed inside the case to compress the refrigerant, and an elastic support portion for elastically supporting the compression unit to be spaced apart from an inner surface of the case, and the elastic support portion may include a wire spring having a plurality of linear portions and curved portions each connecting two adjacent linear portions.

Accordingly, a simplified structure can be obtained and a manufacturing cost can thusly be reduced.

The wire spring may be disposed symmetrically with respect to a center line passing through a center of the case.

The wire spring may be provided with a first wire spring and a second wire spring symmetrically disposed with each other with respect to the center line.

One end portion of each of the first wire spring and the second wire spring may be connected to the compression unit, and another end portion of each of the first wire spring and the second wire spring may be connected to each other by a connecting portion.

The connecting portion by which the first wire spring and the second wire spring are connected to each other may be supported by the case.

A vibration insulating member for insulating vibration may be provided between the wire spring and the case.

With the configuration, vibration generated in the compression unit can be prevented from being transmitted to the case.

A compressor according to an implementation of the present disclosure may include a case, a compression unit having a cylinder defining a compression space for refrigerant, a piston disposed to reciprocate in the cylinder, and a driving unit for reciprocating the piston in an axial direction, and a support unit provided at a front end portion or a rear end portion of the compression unit and elastically supporting the compression unit to be spaced apart from an inner surface of the case. The support unit may include a wire spring having a plurality of linear portions disposed in parallel with one another, and curved portions each connecting two adjacent linear portions. The wire spring may include a first wire spring and a second wire spring symmetrically disposed with each other with respect to a center line passing through a center of the case. One end portion of each of the first wire spring and the second wire spring may be connected to the compression unit. The wire spring may include a connecting portion connecting another end portions of the first wire spring and the second wire spring to each other. The connecting portion may be supported by the case.

Accordingly, the support unit can be simplified in structure. This may facilitate a manufacture of the support unit, thereby reducing a manufacturing cost.

The case may be implemented in a cylindrical shape. The case may have a length relatively longer than a diameter. The case may include, for example, a case body in a cylindrical shape, and covers for blocking both end portions of the case body.

The case may be configured such that its lengthwise direction is in parallel with a horizontal direction. Accordingly, in a refrigerator with the compressor according to the implementation, a height of a machine room in which the compressor is installed can be significantly lowered even without increasing a size of a cabinet of the refrigerator, thereby remarkably increasing a food accommodation space for storing food.

A plurality of legs may be provided on a lower portion of the case. The plurality of legs each may be provided with a vibration insulating member (e.g., vibration-proof rubber). This may result in preventing vibration of the case from being transferred to an object to be supported (e.g., a bottom surface of the machine room).

The compression unit may include, for example, a cylinder, a piston reciprocating inside the cylinder, and a driving unit for reciprocating the piston.

The cylinder may have a cylindrical shape. The cylinder may be disposed in a back and forth direction of the case. The piston may reciprocate in the back and forth direction of the case. In an implementation, the back and forth direction and the axial direction of the case may be understood as the same direction.

A compression space of refrigerant may be defined in one end portion (front end portion) of the cylinder.

One end portion (front end portion) of the piston may be inserted into the cylinder.

A head may be provided on the one end portion (the front end portion) of the piston, and suction ports through which the refrigerant is suctioned into the compression space may be formed through the head. A suction valve for opening and closing the suction ports may be provided at the head of the piston. The suction valve may open the suction ports when the piston is moved to a bottom dead center, and block the suction ports when the piston is moved to a top dead center.

The driving unit may include, for example, a stator and a mover connected to the piston and reciprocating relative to the stator in the axial direction.

Accordingly, the piston can reciprocate, in response to the movement (reciprocating motion) of the mover.

The stator may include, for example, an outer stator and an inner stator arranged concentrically with each other, and a stator coil wound around the outer stator and/or the inner stator.

A frame may be provided on an outer side of the cylinder.

The frame may include a body portion coupled to the outer curved surface of the cylinder, and a flange portion extending from one end portion (front end portion) of the body portion in a radial direction.

A discharge valve may be disposed at one end portion (front end portion) of the cylinder to selectively open and close the compression space of the cylinder.

The discharge valve may close the end portion of the cylinder and open the compression space when internal pressure of the compression space reaches a preset pressure.

The compression unit may include a discharge cover surrounding a discharge port through which compressed refrigerant is discharged from the compression space.

A discharge space into which the refrigerant compressed in the compression space is discharged may be defined in the discharge cover.

The discharge cover may be coupled to a front end portion of the cylinder and a front end portion of the frame.

The cylinder may be provided with nozzles for spraying gas into a gap between an inner curved surface of the cylinder and an outer curved surface of the piston.

With the configuration, friction between the cylinder and the piston can be reduced.

The nozzles may communicate with the discharge space. Thus, the compressed refrigerant (gas) in the discharge space can be supplied to the nozzles.

The driving unit may be provided at the rear of the frame (flange portion) in the axial direction.

The stator may be provided at the rear of the flange portion, and a stator cover may be provided on a rear end portion of the stator. The stator cover may be formed in a disk shape, and provided with a through portion formed through its center. The mover may be inserted into the through portion so as to reciprocate in the through portion.

A resonance spring may be provided at the rear of the stator cover.

The resonance spring may include a first resonance spring and a second resonance spring.

The first resonance spring may be disposed at the rear of the stator cover and the second resonance spring may be disposed at the rear of the first resonance spring.

A back cover may be coupled to a rear end portion of the resonance spring. The back cover may be disposed at the rear of the second resonance spring.

In one implementation, the back cover may be disposed on the rear end portion of the compression unit and the discharge cover may be provided on the front end portion of the compression unit.

In one implementation, the support unit may include, for example, a front support unit for elastically supporting the front end portion of the compression unit in the axial direction, and a rear support unit for supporting the rear end portion of the compression unit.

In one implementation, the rear support unit may be provided with the wire spring, for example.

The wire spring may include a plurality of linear portions arranged in parallel with one another, and curved portions each connecting two adjacent linear portions to be elastically deformable.

Here, the wire spring may be formed by bending an elastically deformable wire rod having a circular cross-section into a preset shape (pattern), for example.

The wire spring may be disposed symmetrically with respect to a center line passing through a center of the case.

More specifically, the wire spring may be provided with a first wire spring and a second wire spring symmetrically disposed with each other with respect to the center line.

One end portion of each of the first wire spring and the second wire spring may be connected to the compression unit, and another end portions of the first wire spring and the second wire spring may be connected to each other by a connecting portion.

The wire spring may be supported by the case.

More specifically, the connecting portion by which the first wire spring and the second wire spring are configured to each other may be supported by the case.

In one implementation, coupling bosses to which the one end portion of the first wire spring and the one end portion of the second wire spring are connected, respectively, may be provided in the rear end portion of the compression unit.

This may facilitate coupling and separation between the first and second wire springs and the compression unit.

In one implementation, a suction cover defining a suction flow path for refrigerant may be provided on the rear end portion of the compression unit.

The suction cover may extend from a center of the suction unit in a radial direction. Accordingly, the suction flow path may extend from a center of the rear end portion of the compression unit in the radial direction.

The suction cover may surround the coupling bosses.

This may result in preventing the wire spring coupled to the compression unit from being separated unexpectedly from the compression unit in the axial direction.

Each of the coupling bosses may be provided with a fixing member coupling portion to which the fixing member inserted through the suction cover is coupled.

The fixing member may include, for example, a male screw portion, and the fixing member coupling portion may include a female screw portion corresponding to the male screw portion.

The suction cover may include a fixing member inserting portion into which the fixing member is coupled.

In one implementation, a suction pipe through which refrigerant is suctioned may be connected to the case. The suction pipe may be connected to a circumferential surface of the case (case body).

This may prevent an increase in an axial length of the compressor due to the suction pipe.

In one implementation, coupling rings coupled to circumferences of the coupling bosses may be provided on one end portion of the first wire spring and one end portion of the second wire spring, respectively.

This may facilitate coupling and separation between the first and second wire springs and the compression unit.

A vibration insulating member for suppressing vibration transmission may be provided between the coupling boss and the coupling ring.

The vibration insulating member may be made of a rubber member.

Accordingly, vibration generated when the compression unit is operated can be suppressed from being transmitted to the case through the wire spring (the first wire spring and the second wire spring).

In one implementation, a fixing bracket to which the connecting portion of the wire spring is fixed may be provided on an upper end of the inner surface of the case.

A vibration insulating member for suppressing transmission of vibration may be provided between the fixing bracket and the connecting portion.

Accordingly, the transmission of the vibration between the wire spring and the fixing bracket can be suppressed. More specifically, the vibration of the wire spring can be suppressed from being transmitted to the fixing bracket.

The vibration insulating member may be formed by insert-injecting the connecting portion.

The vibration insulating member may be formed to surround the circumference of the connecting portion, that is, an upper surface, a lower surface, and both side surfaces of the connecting portion.

In one implementation, the fixing bracket may be formed so that the vibration insulating member can be slidably inserted.

The fixing bracket may have one side (front side) open in the axial direction, for example.

The vibration insulating member may be slidably inserted into the fixing bracket in a direction from the front to the rear of the fixing bracket.

In one implementation, an engagement part may be provided at a contact region between the fixing bracket and the vibration insulating member to suppress movement after the vibration insulating member and the fixing bracket are coupled to each other.

The fixing bracket may have a cross-section in a shape like "U" so as to be in contact with an upper surface, a lower surface, and one side surface (rear surface) of the vibration insulating member.

With this configuration, the manufacturing of the fixing bracket can be facilitated.

The vibration insulating member may be formed in a shape having a rectangular cross-section, for example.

In one implementation, the engagement part may include a protrusion protruding from one of contact surfaces of the vibration insulating member and the fixing bracket toward another contact surface, and a protrusion accommodating portion formed to accommodate the protrusion.

In one implementation, the protrusion may protrude from one side surface (rear end surface) of the vibration insulating member in the axial direction, and the protrusion accommodating portion may be formed through a rear end surface of the fixing bracket to accommodate the protrusion.

This may facilitate the coupling between the vibration insulating member and the fixing bracket, and prevent the vibration insulating member from moving in directions toward both sides of the fixing bracket (i.e., both lateral directions perpendicular to back and forth directions).

In one implementation, the support unit may include a front support unit provided at the front end portion of the compression unit and a rear support unit provided at the rear end portion of the compression unit, and the rear support unit may include the wire spring. The front support unit may include a pair of front springs extending outward from the front end portion of the compression unit to be downwardly inclined.

The pair of front springs may be expandable and contactable in a direction of being downwardly inclined from the front end portion of the compression unit to outside. Each of the pair of front springs may be implemented as a compression coil spring.

In one implementation, a fixing bracket to which the connecting portion of the wire spring is fixed may be provided on an upper end of the inner surface of the case.

Accordingly, the generation of rotational moment to rotate the case during the reciprocating motion of the piston can be minimized by interaction between reaction force of a front spring of the front support unit and reaction force of a wire spring of the rear support unit when the compression unit is operated.

In one implementation, a vibration insulating member for suppressing transmission of vibration may be provided between the fixing bracket and the connecting portion.

With the configuration, vibration of the wire spring can be prevented from being transmitted to the case via the fixing bracket.

In one implementation, the support unit may include a front support unit provided at the front end portion of the compression unit, and a rear support unit provided at the rear end portion of the compression unit. Each of the front support unit and the rear support unit may be provided with the wire spring.

Accordingly, the front support unit and the rear support unit can be simplified in structure and easily manufactured.

With this configuration, the manufacturing costs of the front support unit and the rear support unit can be reduced.

In one implementation, the wire spring of the front support unit and the wire spring of the rear support unit may be fixed at positions spaced apart from each other in a circumferential direction of the case.

Accordingly, the generation of rotational moment transmitted to the case when the compression unit is operated can be minimized, and the occurrence of vibration of the case due to the rotational moment can be suppressed.

The wire spring of the front support unit and the wire spring of the rear support unit may be fixed at positions spaced apart from each other by 180 degrees in the circumferential direction of the case.

Accordingly, the generation of the rotational moment to rotate the case can be minimized by interaction between reaction force of the wire spring of the front support unit and reaction force of the rear support spring.

In one implementation, the plurality of linear portions of each of the first wire spring and the second wire spring may include a first linear portion having a first length, a second linear portion having a second length shorter than the first length, a third linear portion having the first length or the second length, and a fourth linear portion having the second length.

The second linear portion and the third linear portion may be disposed in parallel at both sides of the first linear portion, and the fourth linear portion may be disposed in parallel at one side of the third linear portion.

With the configuration, interference between the wire spring and an inner surface of the case can be prevented in the case having a circular cross-section. Accordingly, the wire spring can be freely installed inside the case.

The curved portions of each of the first wire spring and the second wire spring may include a first curved portion connecting the first linear portion and the second linear portion, a second curved portion connecting the first linear portion and the third linear portion, and a third curved portion connecting the third linear portion and the fourth linear portion.

Here, the first curved portion, the second curved portion, the third curved portion, and the fourth curved portion may have the same radius of curvature.

The radius of curvature of the curved portions may be the same as half of a distance between the adjacent linear portions.

For example, the radius of curvature of the curved portions may be 5 mm when the distance between the adjacent linear portions is 10 mm.

In one implementation, the second linear portion of each of the first wire spring and the second wire spring may be provided with a coupling ring coupled to the compression unit.

The coupling ring may be formed in an arcuate shape having one side open, for example.

The coupling ring may extend from an end portion of the second linear portion into an arcuate shape with one side open.

The coupling ring may have an inner diameter greater than an outer diameter of the coupling boss.

More specifically, the inner diameter of the coupling ring may be set in consideration of a thickness of the vibration insulating member coupled between the coupling ring and the coupling boss.

In one implementation, the fourth linear portions of the first wire spring and the second wire spring may be integrally connected to each other by the connecting portion.

Since the first wire spring and the second wire spring are symmetrically disposed with respect to a center line passing through a center of the case, the center line may pass through a center of the connecting portion.

In one implementation, the coupling rings of the first wire spring and the second wire spring may be disposed on an upper side of the connecting portions, respectively.

The connecting portion may include an arcuate section having a radius of curvature corresponding to the inner surface of the case, and bent sections bent from both end portions of the arcuate section to be connected to the fourth linear portions of the first wire spring and the second wire spring, respectively.

Accordingly, interference between the wire spring (connecting portion) and the case can be suppressed.

Here, the arcuate section of the connecting portion may be disposed on a bottom surface in the case, for example.

With the configuration, a transmission path of vibration, which is generated in the compression unit when the compression unit is operated and transmitted to legs of the case through the connecting portion via the first wire spring and the second wire spring, can be significantly shortened, resulting in minimizing vibration of the case.

In one implementation, the plurality of linear portions of each of the first wire spring and the second wire spring may be inclined outwardly or inwardly, respectively, with respect to a center line passing through a center of the case.

This may result in appropriately maintaining longitudinal rigidity and transverse rigidity of the wire spring, respectively. According to the configuration, the vibration (displacement) occurred in the compression unit can be appropriately mitigated by the wire spring.

In one implementation, the wire spring may be provided with an anti-rotation section protruding horizontally in a lengthwise direction of the connecting portion to suppress rotation.

The anti-rotation section may be supported by the fixing bracket.

Accordingly, relative rotation of the wire springs (the first wire spring and the second wire spring) with respect to the case (the fixing bracket) can be suppressed.

A vibration insulating member may be provided between the anti-rotation section and the fixing bracket.

Accordingly, vibration of the wire spring (the first wire spring and the second wire spring) can be suppressed from being transmitted to the fixing bracket (the case).

The vibration insulating member may be manufactured by injection molding after inserting the anti-rotation section into a mold.

As described above, according to an implementation of the present disclosure, a support unit for supporting a compression unit may include a wire spring having a plurality of linear portions spaced apart from one another, and curved portions each connecting two adjacent linear portions, whereby the configuration of the support unit can be simplified and manufacturing of the support unit can be facilitated.

A coupling boss to which the wire spring is coupled may be provided in a rear end portion of the compression unit, thereby allowing the wire spring and the compression unit to be fast coupled to and separated from each other.

In addition, a suction cover defining a suction flow path may be provided at the rear end portion of the compression unit so as to cover the coupling boss, thereby preventing separation of the wire spring that is coupled to the coupling boss.

A suction pipe may be installed on a circumferential surface of the case, thereby preventing an increase in an axial length of the compressor due to the installation of the suction pipe.

A coupling ring may be provided on an end portion of the wire spring (the first wire spring and the second wire spring), thereby allowing the wire spring and the compression unit (coupling boss) to be quickly and easily coupled to and separated from each other.

A vibration insulating member may be provided between the coupling ring of the wire spring and the coupling boss, thereby suppressing vibration of the compression unit from being transmitted to the wire spring.

The support unit may include a front support unit and a rear support unit. The rear support unit may include a wire spring, and the front support unit may include a pair of front springs extending outwardly from the front end portion of the compression unit to be downwardly inclined. With the configuration, an overall structure of the support unit can be simplified, so as to facilitate manufacturing of the support unit, thereby reducing an overall manufacturing cost of the support unit.

The wire spring of the rear support unit may be supported by an upper end in the case, such that reaction force of the front spring and reaction force of the wire spring can interact with each other, thereby minimizing the generation of rotational moment to rotate the case. This may result in preventing vibration of the case due to the rotational moment.

A connecting portion of the wire spring may be supported by the fixing bracket of the case, and a vibration insulating member may be provided between the connecting portion and the fixing bracket, thereby suppressing vibration of the wire spring from being transferred to the fixing bracket.

The vibration insulating member may be slidably inserted between the fixing bracket and the connecting portion of the wire spring, thereby allowing the wire spring and the fixing bracket to be quickly and easily coupled to and separated from each other.

An engagement part may be provided between the fixing bracket and the vibration insulating member such that the fixing bracket and the vibration insulating member can be engaged with each other, which may allow the fixing bracket to be simplified in structure and easily manufactured, thereby facilitating the coupling between the vibration insulating member and the fixing bracket.

Each of the front support unit and the rear support unit may be provided with the wire spring, which may allow the front support unit and the rear support unit to be simplified in structure and easily manufactured, thereby remarkably reducing manufacturing costs.

In addition, the front support unit and the rear support unit each may be provided with the wire spring, and fixed at positions spaced apart by 180 degrees from each other in a circumferential direction of the case, so that reaction force of the wire spring of the front support unit and reaction force of the wire spring of the rear support unit can interact each other, thereby minimizing the generation of rotational moment in the case. This may result in remarkably reducing vibration of the case occurred due to the rotational moment.

Each of the first wire spring and the second wire spring may include a first linear portion having a first length, a second linear portion, a third linear portion, and a fourth linear portion each having a second length, and the second linear portion and the third linear portion may be respectively disposed at both sides of the first linear portion, thereby preventing an occurrence of interference between the first and second wire springs and the inner surface of the case having a circular cross-section. Accordingly, the first wire spring and the second wire spring can be freely installed inside the case.

The connecting portion of the wire spring may be provided with an arcuate section having a radius of curvature corresponding to the inner surface of the case, and bent sections bent from both ends of the arcuate section to be connected to the fourth linear portions of the first and second wire springs, respectively, thereby preventing an occurrence of interference between the connecting portion and the case.

The linear portions of each of the first wire spring and the second wire spring may be disposed to be inclined inwardly or outwardly, respectively, with respect to a center line passing through a center of the case, thereby appropriately maintaining longitudinal rigidity and transverse rigidity of the wire spring (the first wire spring and the second wire spring).

The connecting portion of the wire spring may be provided with an anti-rotation section disposed in the axial direction, whereby relative rotation of the wire spring to the case (the fixing bracket) can be prevented.

DETAILED DESCRIPTION

Hereinafter, implementations disclosed in this specification will be described in detail with reference to the accompanying drawings. In this specification, the same or equivalent components may be provided with the same or similar reference numbers even in different implementations, and description thereof will not be repeated. A singular representation used herein may include a plural representation unless it represents a definitely different meaning from the context. In describing the present invention, if a detailed explanation for a related known technology or construction is considered to unnecessarily divert the main point of the present disclosure, such explanation has been omitted but would be understood by those skilled in the art. It should be noted that the attached drawings are provided to facilitate understanding of the implementations disclosed in this specification, and should not be construed as limiting the technical idea disclosed in this specification by the attached drawings.

Figure 1:
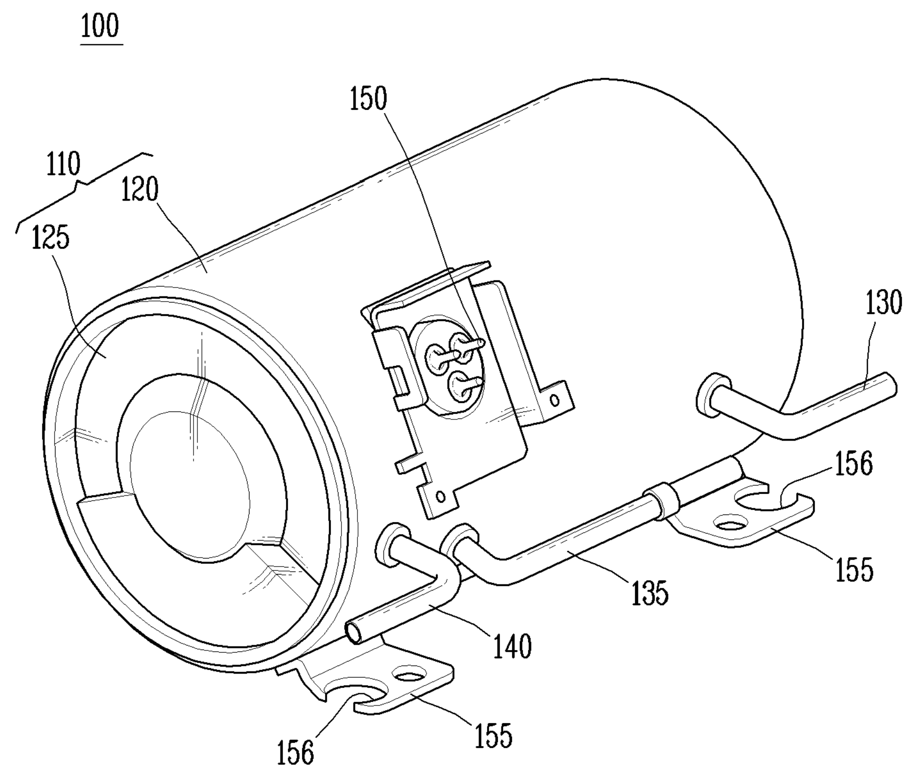
FIG. 1 is a perspective view of a compressor in accordance with one implementation of the present disclosure.
Figure 2:
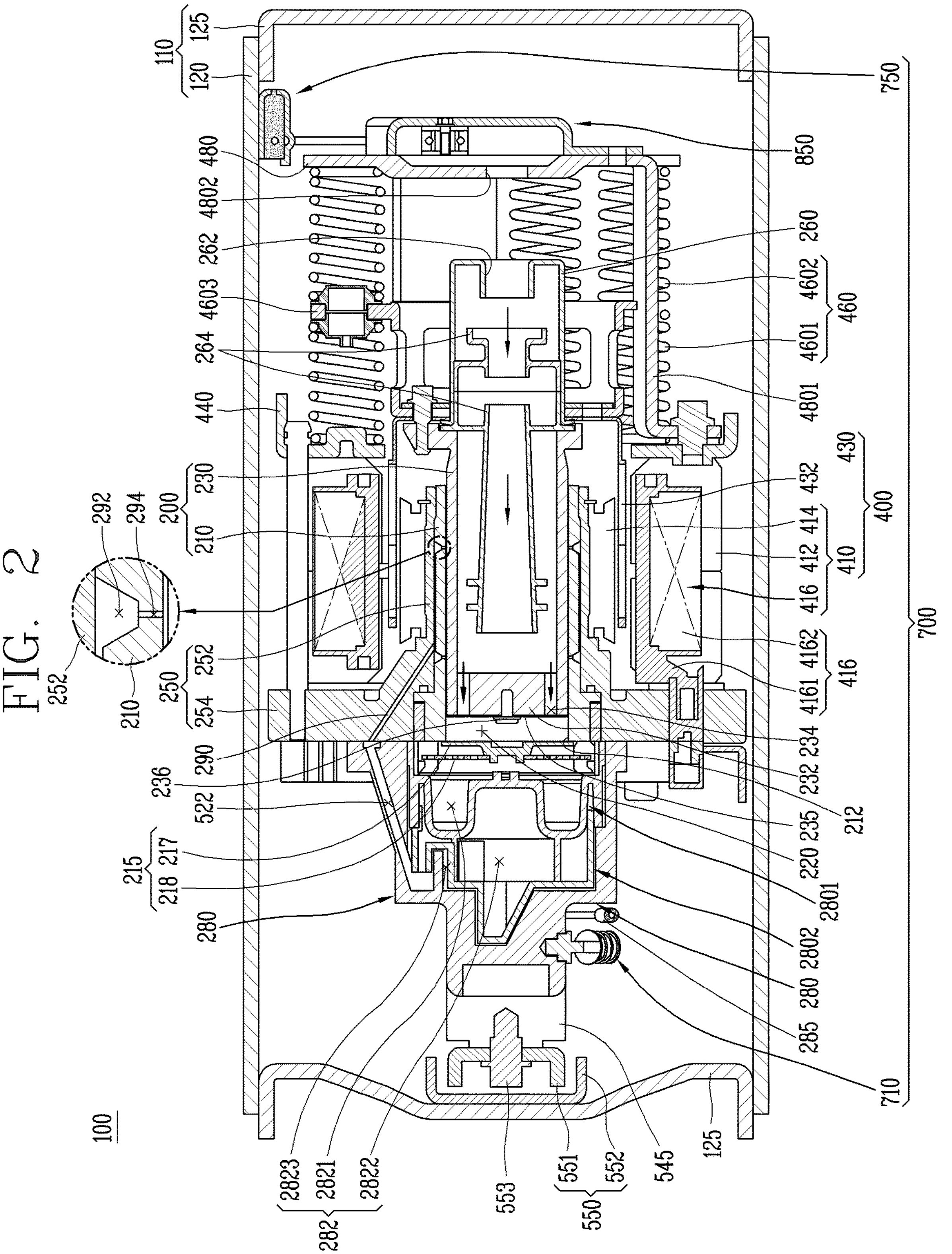
FIG. 2 is a sectional view of the compressor of FIG. 1.

FIG. 1 is a perspective view of a compressor in accordance with one implementation of the present disclosure, and FIG. 2 is a sectional view of the compressor of FIG. 1. As illustrated in FIGS. 1 and 2, a compressor 100 according to this implementation may include a case 110, a compression unit 200, and a support unit 700.

The case 110 may define an inner hermetic accommodation space.

The case 110 may include, for example, a case body 120 having a substantially cylindrical shape and a cover 125 for blocking both ends of the case body 120.

The compressor 100 of this implementation may have a length of about 30 cm and a diameter of about 10 cm.

The case 110 may be disposed horizontally in its lengthwise direction. In the implementation, a horizontal direction in FIG. 2 may refer to a left and right direction in the drawings. In addition, the left and right direction in FIG. 2 may refer to a front and rear direction of the case 110.

With this configuration, in a refrigerator provided with the compressor 100 according to the implementation, a height of a machine room can be significantly reduced, thereby increasing a size of an inner food storage space without increasing a size of a cabinet (refrigerator body).

A plurality of legs 155 may be provided on a lower portion of the case 110.

The plurality of legs 155 may be provided on both sides of the lower portion of the case 110, respectively.

The plurality of legs 155 may be provided as a pair on a front end portion and a rear end portion of the case 110, respectively. Each of the legs 155 may be provided with an anti-vibration rubber coupling portion 156 to which an anti-vibration rubber (not shown) is coupled. The anti-vibration rubber coupling portion 156, for example, may have a circular cross-section with one side open. In this implementation, the anti-vibration rubber coupling portion 156 may be opened in the axial direction.

A suction pipe 130 through which refrigerant to be compressed is suctioned may be provided at the case 110.

In this implementation, the suction pipe 130 may be provided on a circumferential surface of the case body 120. The suction pipe 130 may be provided on a rear side surface (circumferential surface) of the case 110.

Accordingly, unlike the related art in which the suction pipe 130 is provided on a rear end portion of the case 110 to thereby increase an axial length of the compressor 100, in this implementation, the length of the compressor 100 (case 110) in the axial direction can be shortened.

The suction pipe 130 may be provided on a side surface of the rear end portion of the case body 120.

The case 110 may be provided with a discharge pipe 135 through which compressed refrigerant is discharged.

The discharge pipe 135 may be provided on a front end portion of the case 110 (case body 120).

A process pipe 140 through which refrigerant is refilled may be provided on the case 110 (case body 120). The process pipe 140 may be provided at one side (front side in the drawing) of the discharge pipe 135.

A terminal 150 may be provided on the case 110 to supply power. The terminal 150 may be connected to, for example, a commercial power source or a power supply unit (e.g., inverter) (not shown) connected to the commercial power source.

The terminal 150 may be electrically connected to a driving unit 400 of the compression unit 200, which is to be explained later, inside the case 110. Accordingly, the driving unit 400 of the compression unit 200 may be driven by receiving power from the power supply unit.

The compression unit 200 may include, for example, a cylinder 210, a piston 230 having one end portion inserted into the cylinder 210, and a driving unit 400 providing a driving force such that the piston 230 reciprocates with respect to the cylinder 210.

The cylinder 210 may be formed, for example, in a cylindrical shape with both sides open. The cylinder 210 may have a length longer than its diameter. The cylinder 210 may be disposed in a lengthwise direction of the case 110. A compression space 220 for refrigerant may be defined at one side (front side) in the cylinder 210. One end portion of the piston 230 may be inserted into the cylinder 210.

The piston 230 may be implemented in a cylindrical shape with one end portion closed. The piston 230 may be provided with a head 232 on its one end portion (front end portion). The piston 230 may be configured to reciprocate between a top dead center at which the piston 230 is inserted into the cylinder 210 by a maximum depth and a bottom dead center at which the piston 230 is spaced maximally apart from the top dead center in the axial direction.

The head 232 may be provided with suction ports 234 through which refrigerant can be suctioned into the compression space 220. The piston 230 may be provided with a suction valve 235 for opening and closing the suction ports 234.

The suction valve 235, for example, may close the suction ports when the piston 230 moves to the top dead center, and open the suction ports 234 when the piston 230 moves to the bottom dead center. The suction valve 235 may be coupled to a front end portion of the piston 230 (head 232). The suction valve 235 may be coupled to the case 232 by a fixing member 236.

A discharge valve assembly 215 for selectively opening and closing the compression space 220 may be provided on the front of the cylinder 210. The discharge valve assembly 215 may include, for example, a discharge valve 217 for closing a front opening of the cylinder 210, and a discharge valve spring 218 for applying an elastic force to the discharge valve 217 such that the discharge valve 217 closes the front opening of the cylinder 210.

The discharge valve 217 may be formed in a disk shape. The discharge valve 217 may be brought into contact with the front end portion of the cylinder 210 so as to block the front opening of the cylinder 210.

The discharge valve spring 218 may apply the elastic force to the discharge valve 217 so that the discharge valve 217 can be brought into contact with the front end portion of the cylinder 210. The discharge valve 217 may be pressed by the discharge valve spring 218 to be kept in contact with the front end portion of the cylinder 210. The discharge valve spring 218 may be elastically deformed such that, for example, the discharge valve 217 opens the front opening of the cylinder 210 when internal pressure of the compression space 220 reaches a preset pressure. The elastic force of the discharge valve spring 218 may be set to be less than or equal to the preset internal pressure of the compression space 220.

This implementation illustrates the case where the discharge valve 217 is brought into contact with the front end portion of the cylinder 210 to close the front opening of the cylinder 210, but this is merely illustrative and the present disclosure may not be limited to this. For example, the discharge valve 217 may alternatively be inserted into the front opening of the cylinder 210 to close the front opening of the cylinder 210. In this implementation, the front opening of the cylinder 210 may be defined as a discharge port 212 in that compressed gas in the compression space 220 is discharged through the opening.

Meanwhile, a suction muffler 260 may be provided on a rear end portion of the piston 230. The suction muffler 260, for example, may be formed substantially in a cylindrical shape. One end portion (front end portion) of the suction muffler 260 may be integrally coupled to the piston 230. Accordingly, the suction muffler 260 may reciprocate in association with the piston 230. An inner space of the suction muffler 260 may be divided into a plurality of spaces in the axial direction. Guides 264 for communicating the plurality of spaces may be provided inside the suction muffler 260.

Each of the guides 264 may have a relatively small flow cross-sectional area compared to the plurality of spaces. Accordingly, refrigerant suctioned into the suction muffler 260 may be expanded in the plurality of spaces with a large flow cross-sectional area and contracted in the guides 264 with a small flow cross-sectional area. While the process is repeated, noises may be reduced.

A frame 250 may be provided on an outer curved surface of the cylinder 210. The frame 250 may include, for example, a body portion 252 coupled to the outer curved surface of the cylinder 210, and a flange portion 254 extending in a radial direction from one end portion (front end portion) of the body portion 252. The body portion 252, for example, may be press-fitted into the outer curved surface of the cylinder 210.

A discharge cover 280 may be provided at the front end portion of the cylinder 210 and the frame 250. A discharge space 282 into which refrigerant is discharged may be provided in the discharge cover 280. A discharge valve spring 218 may be provided in the discharge cover 280. The discharge space 282 may be disposed at the front of the discharge valve spring 218.

A first plenum 2801 and a second plenum 2802 which define a plurality of discharge spaces 282 that communicate with one another may be provided in the discharge cover 280. Here, the first plenum 2801 and the second plenum 2802 each may be provided with an outer wall surface that comes in surface-contact with an inner wall surface of the discharge cover 280. The first plenum 2801 and the second plenum 2802 may define a first discharge space 2821 and a second discharge space 2822 at an inner side of the outer wall surfaces, respectively. This may result in effectively suppressing thermal energy of high-temperature refrigerant discharged after being compressed in the compression space 220 from being transferred to the outside of the discharge cover 280.

The discharge space 282 may include a first discharge space 2821 communicating with the compression space 220, a second discharge space 2822 communicating with the first discharge space 2821, and a third discharge space 2823 defined between the discharge cover 280 and the second plenum 2802 so as to communicate with the second discharge space 2822.

A refrigerant outlet hole (not shown) that communicates with the third discharge space 2823 may be formed through one side of the discharge cover 280. The refrigerant outlet hole may be connected to communicate with one end of a loop pipe 285 has another end connected to communicate with the discharge pipe 135. A first refrigerant moving channel 522 may be formed in one side of the third discharge space 2823 so that compressed refrigerant inside the third discharge space 2823 can flow.

The first refrigerant moving channel 522 may communicate with a second refrigerant moving channel 290 formed in the frame 250. The second refrigerant moving channel 290 of the frame 250 may extend between the body portion 252 of the frame 250 and the cylinder 210 via the inside of the flange portion 254 of the frame 250.

Nozzles 294 may be provided in the cylinder 210 to spray refrigerant (gas) into the cylinder 210. Accordingly, friction between the inner curved surface of the cylinder 210 and the outer curved surface of the piston 230 can be reduced. An inlet 292 communicating with the nozzle 294 may be formed in the outer curved surface of the cylinder 210. The inlet 292 may be recessed into the outer curved surface of the cylinder 210 in the radial direction.

Meanwhile, a driving unit 400 for driving the piston 230 may be provided at the rear of the frame 250 (the flange portion 254). The driving unit 400 may include, for example, a stator 410 and a mover 430 reciprocating with respect to the stator 410. The mover 430 may be provided with permanent magnets 432.

The stator 410 may include, for example, an outer stator 412, an inner stator 414 concentrically disposed at an inner side of the outer stator 412 in a spaced manner, and a stator coil 416 wound between the outer stator 412 and the inner stator 414. The stator coil 416 may include, for example, a bobbin 4161 disposed at an outer side of the inner stator 414 in a spaced manner, and a coil portion 4162 wound around the bobbin 4161. A preset gap may be formed between the inner stator 414 and the bobbin 4161. The permanent magnets 432 of the mover 430 may be inserted between the inner stator 414 and the bobbin 4161 to perform a reciprocating motion.

A stator cover 440 may be provided on the rear of the stator 410. The stator 410 may be supported by the flange portion 254 of the frame 250 in contact with its front end portion and the stator cover 440 in contact with its rear end portion. The stator cover 440 may be implemented, for example, in a disk shape. A through portion may be formed through a center of the stator cover 440. The mover 430 may be inserted into the through portion to reciprocate in the axial direction.

A front region of the mover 430 may be inserted into a gap between the stator coil 416 and the inner stator 414 so as to reciprocate in the gap. A rear end portion of the mover 430 may be coupled to a rear end portion of the piston 230. Accordingly, the piston 430 may reciprocate in association with the piston 230 while the mover 430 performs the reciprocating motion.

A resonance spring 460 may be provided on the rear of the stator cover 440. The resonance spring 460 may include a first resonance spring 4601 and a second resonance spring 4602 spaced apart from each other in the axial direction. A spring support portion 4603 having one end portion (front end portion) that is coupled to the mover 430 may be provided between the first resonance spring 4601 and the second resonance spring 4602.

The first resonance spring 4601 may be provided in plurality each having one end portion (front end portion) in contact with the stator cover 440. The plurality of first resonance springs 4601 may be spaced apart from one another in the circumferential direction. A rear end portion of the first resonance spring 4601 may come in contact with a front surface of the spring support portion 4603.

The second resonance spring 4602 may be provided in plurality each having one end portion (front end portion) in contact with a rear surface of the spring support portion 4603. The plurality of second resonance springs 4602 may be spaced apart from one another in the circumferential direction.

A back cover 480 may be provided on a rear end portion of the second resonance spring 4602. The rear end portion of the second resonance spring 4602 may come in contact with the front surface of the spring support portion 4603. The back cover 480 may be integrally coupled to the stator cover 440. The back cover 480 may include a stator cover coupling portion 4801 extending forward to be in contact with the stator cover 440.

Figure 3:
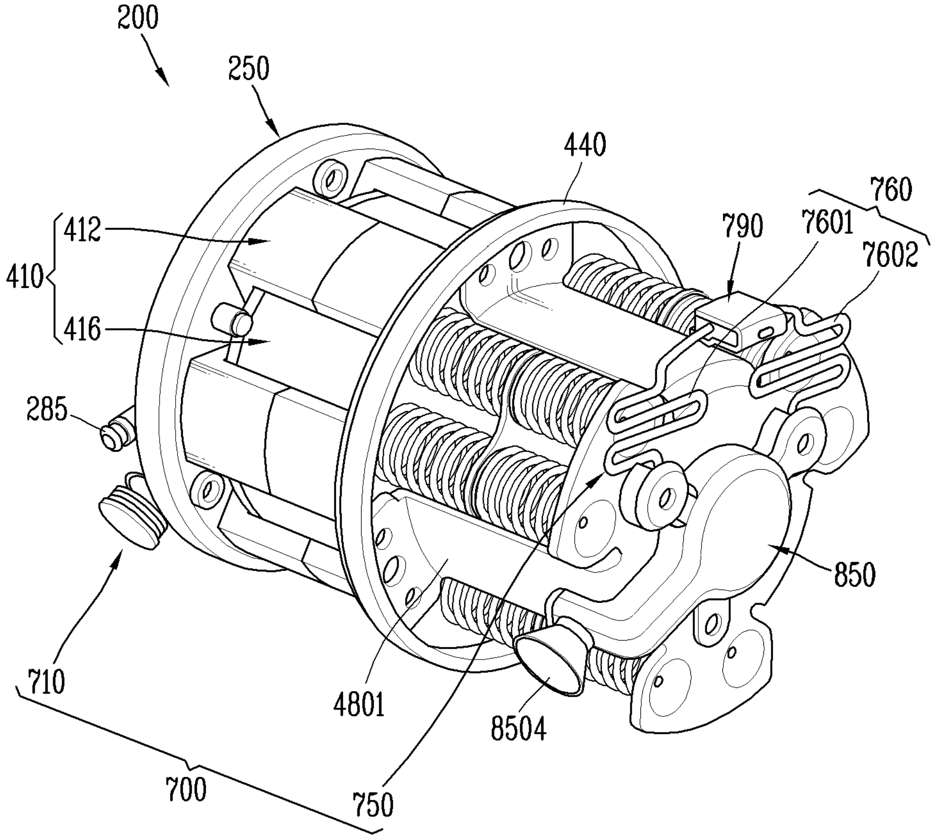
FIG. 3 is a perspective view of a compression unit of FIG. 2.

FIG. 3 is a perspective view of the compression unit of FIG. 2. Referring to FIGS. 2 and 3 together, the driving unit 400 may be provided at the rear of the flange portion 254 of the frame 250. A front end portion of the outer stator 412 may come in contact with a rear end portion of the flange portion 254, and the stator coil 416 may be disposed at an inner side of the outer stator 412.

The stator cover 440 may be coupled to a rear end portion of the stator 410, and the first resonance spring 4601 and the second resonance spring 4602 may be disposed at the rear of the stator cover 440. The back cover 480 may be coupled to the rear end portion of the second resonance spring 4602. The back cover 480 may be coupled to the stator cover 440 through the stator cover coupling portion 4801. The stator cover coupling portion 4801 may extend forward in the axial direction. The stator cover coupling portion 4801 may be provided in plurality spaced apart from one another in a circumferential direction of the stator cover 440. This implementation exemplarily illustrates three stator cover coupling portions 4801, but the present disclosure may not be limited to this.

On the other hand, the compressor 100 according to the implementation may include a support unit 700 that allows the compression unit 200 to be elastically supported while being spaced apart from the inner surface of the case 110.

The support unit 700 may include, for example, a front support unit 710 elastically supporting the front end portion of the compression unit 200, and a rear support unit 750 elastically supporting the rear end portion of the compression unit 200.

The rear support unit 750 may include, for example, a wire spring 760 having a plurality of linear portions L and a plurality of curved portions C each connecting two adjacent linear portions L to be elastically deformable.

In this implementation, the wire spring 760 may be formed by, for example, bending an elastically deformable wire (e.g., spring steel) having a circular cross-section into a preset shape (pattern). Here, the preset shape (pattern) may mean a shape having the plurality of linear portions L and the plurality of curved portions C each connecting the two adjacent linear portions L to be elastically deformable.

Figure 4:
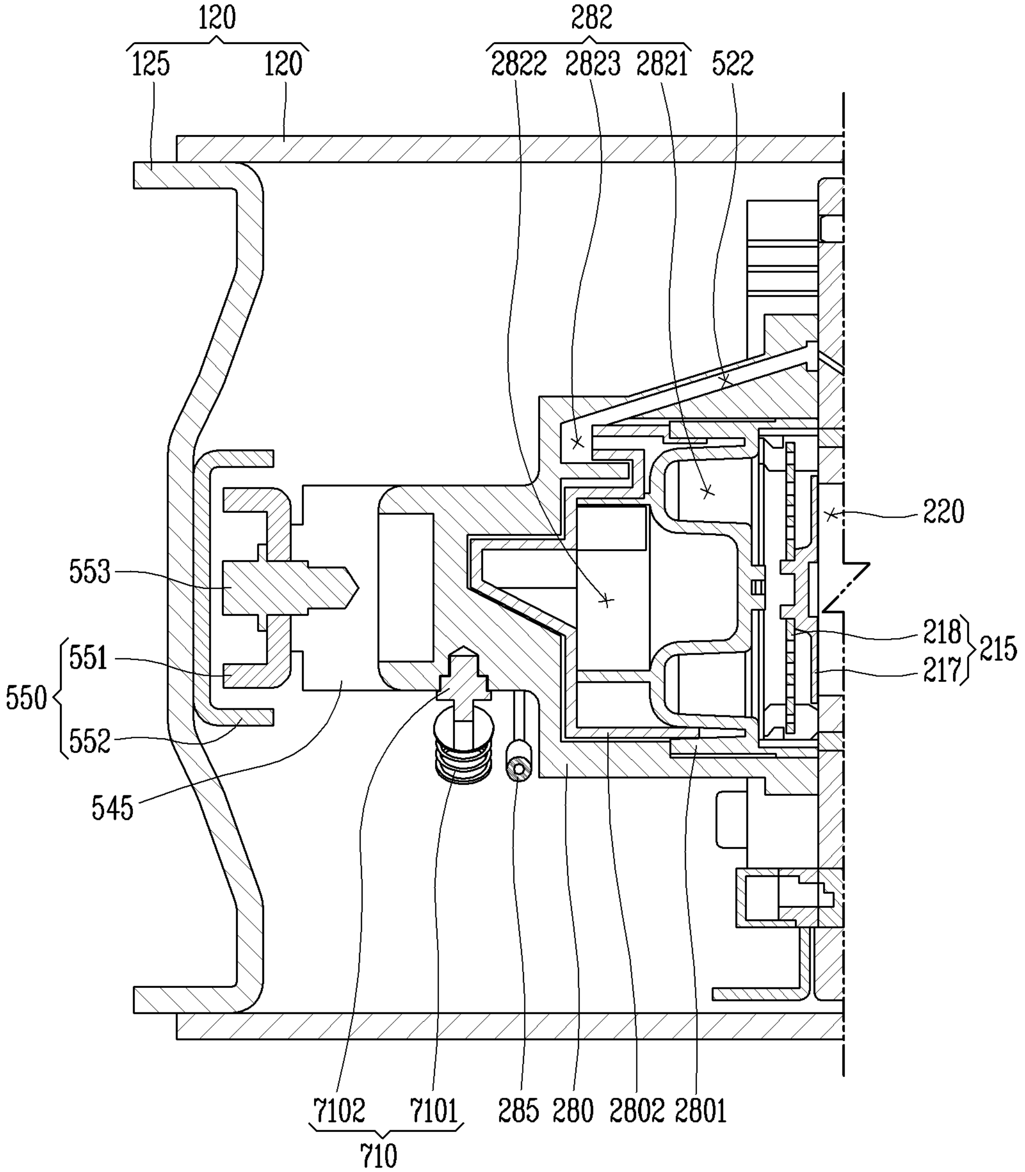
FIG. 4 is an enlarged view of a discharge cover region of FIG. 2.
Figure 5:
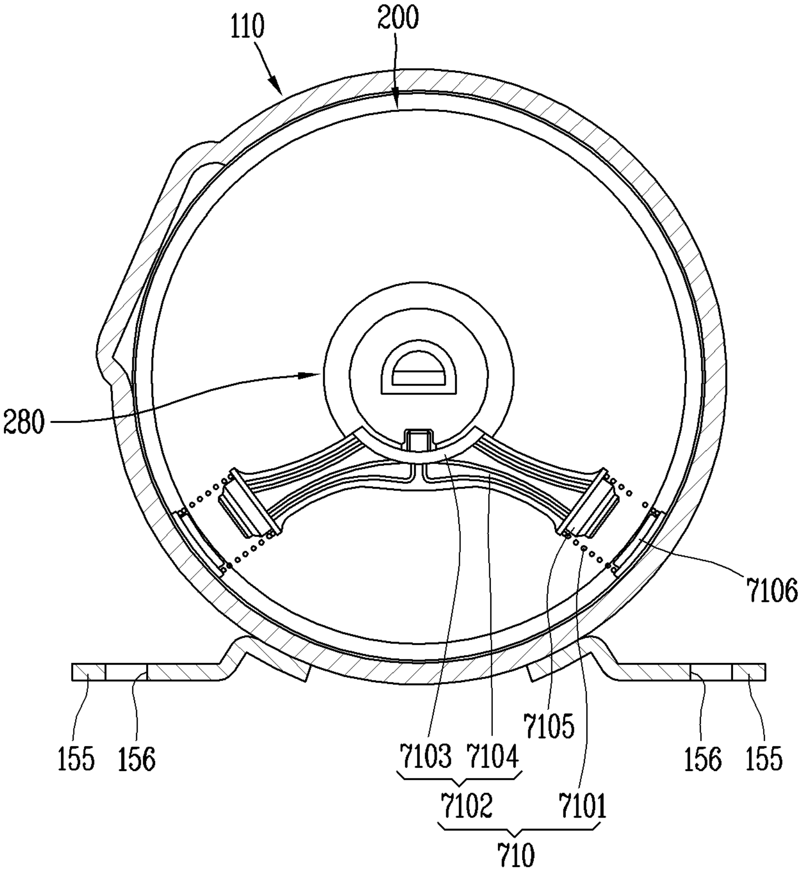
FIG. 5 is a sectional view of a front spring region of FIG. 4.

FIG. 4 is an enlarged view illustrating a discharge cover region of FIG. 2, and FIG. 5 is a cross-sectional view illustrating a front spring region of FIG. 4. As illustrated in FIG. 4, a loop pipe 285 having one end connected to the discharge pipe 135 may be connected to one side of the discharge cover 280. A movement guide 550 for restricting the front end portion of the compression unit 200 from moving in the radial direction may be provided at the front of the discharge cover 280.

The movement guide 550 may include, for example, an inner guide 551 and an outer guide 552 that are concentrically coupled to each other along the radial direction. The inner guide 551 may be formed in a cap-like shape having one side open, for example. The outer guide 552 may be formed in a cap-like shape having one side open, for example. The inner guide 551 and the outer guide 552 may be spaced apart from each other with a preset gap in the radial direction, for example. Here, the preset gap between the inner guide 551 and the outer guide 552 may be set, for example, in consideration of a radial movement range of the front end portion of the compression unit 200.

A support guide 545 to which the inner guide 551 is coupled may be provided on a front end portion of the discharge cover 280. The inner guide 551 may be coupled to the support guide 545 in a manner that its opening faces the front. The outer guide 552 may be coupled to the case 110 (front cover) in a manner that its opening faces the rear.

Meanwhile, the front support unit 710 may be provided on the front end portion of the compression unit 200. The front support unit 710 may be provided on the discharge cover 280, for example. The front support unit 710 may include, for example, front springs 7101 extending outward from a lower portion of the discharge cover 280 to be inclined downwardly.

As illustrated in FIG. 5, the front support unit 710 may include a spring support member 7102 coupled to the compression unit 200 (discharge cover 280) to support the front spring 7101.

The spring support member 7102 may include, for example, a contact portion 7103 brought into contact with the discharge cover 280, and rod portions 7104 each protruding from the contact portion 7103 toward the inner surface of the case 110 to be inclined downwardly.

The front spring 7101 may be implemented as, for example, a compression coil spring.

The front springs 7101 may be arranged to be stretched and contracted in the direction that the rod portions 7104 extend to be inclined downwardly. Foot portions 7106 may be provided on lower ends of the front springs 7101, respectively. The foot portions 7106 may come in contact with the inner surface of the case 110.

Figure 6:
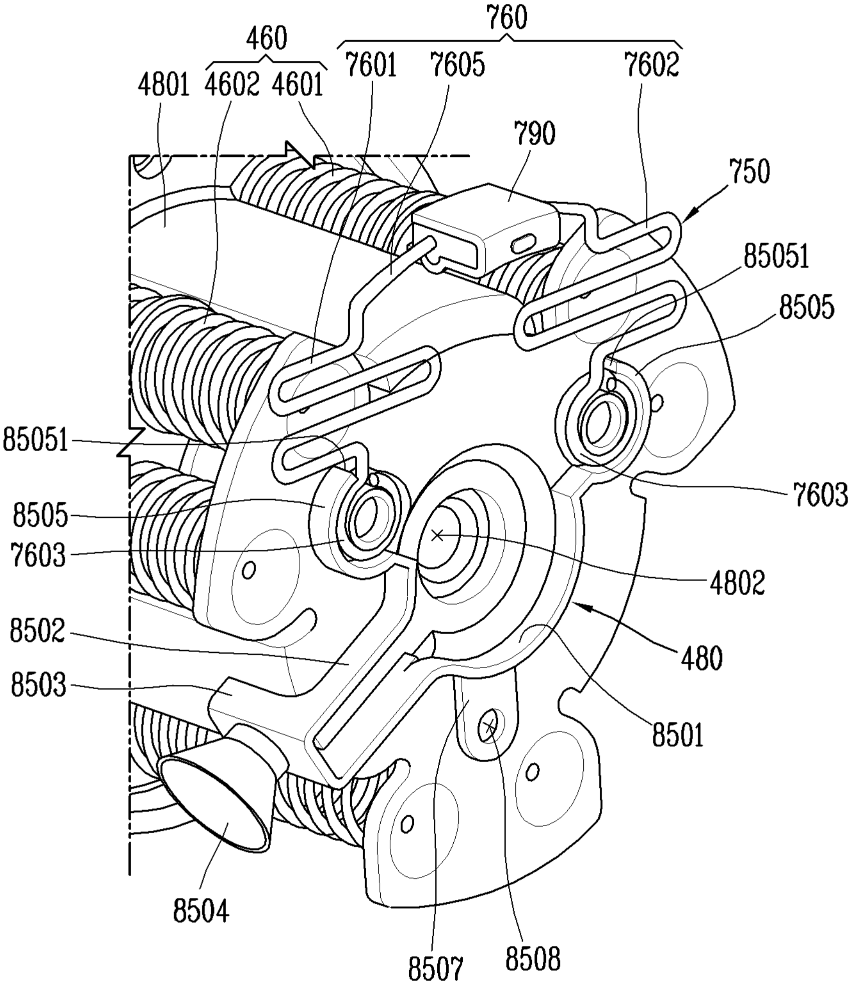
FIG. 6 is a view illustrating an inside of a suction cover of FIG. 3.
Figure 7:
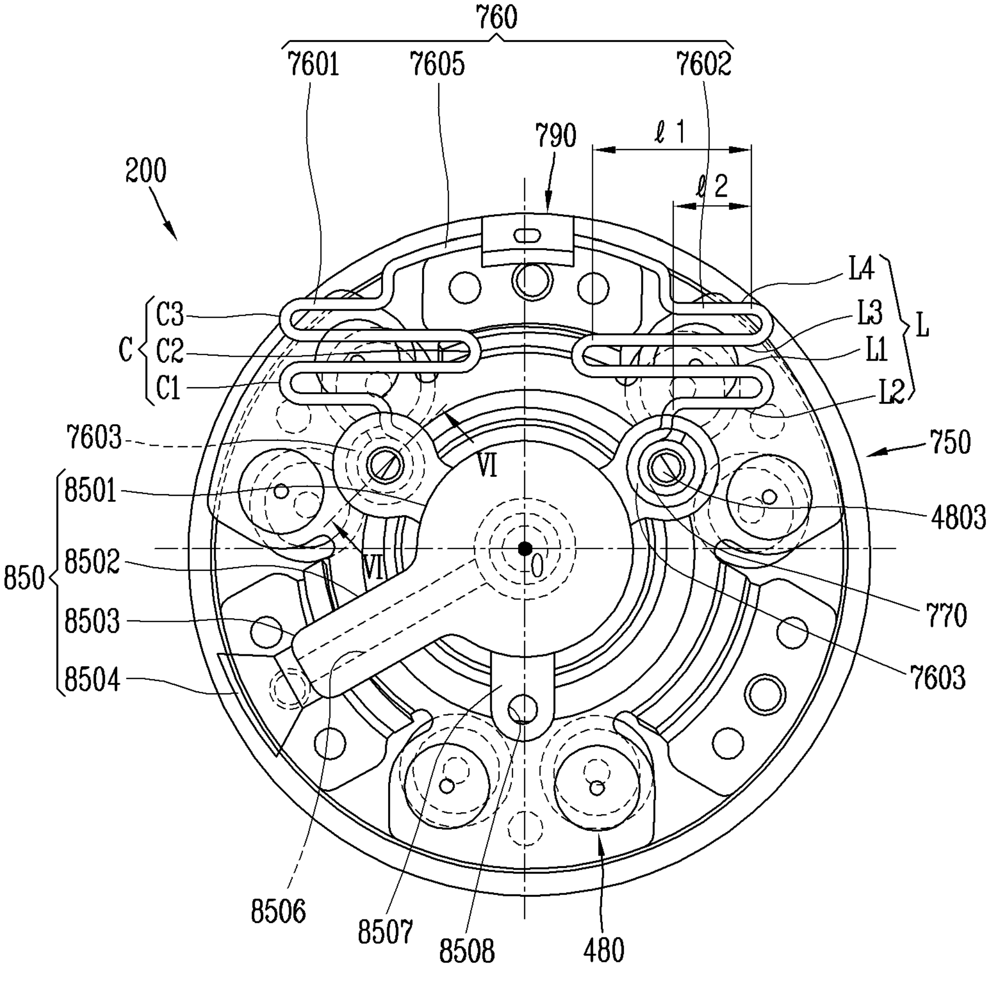
FIG. 7 is a sectional view of FIG. 3.
Figure 8:
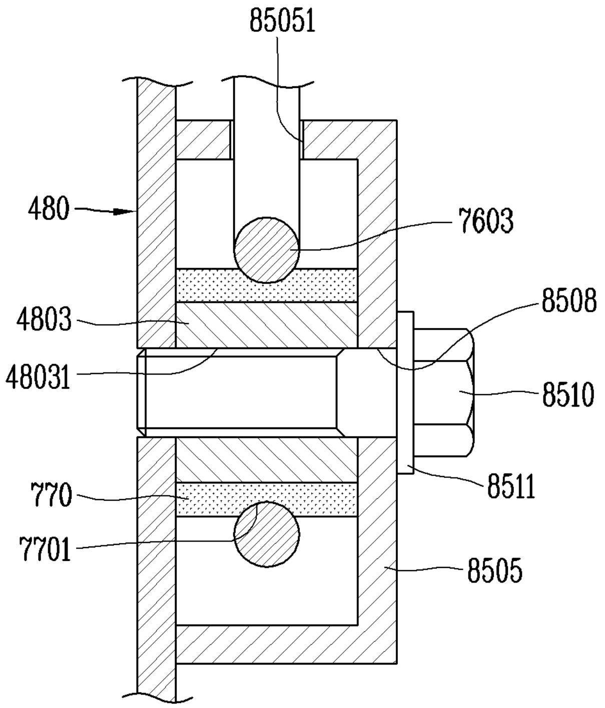
FIG. 8 is an enlarged sectional view illustrating a main part of FIG. 7.

FIG. 6 is a view illustrating an inside of a suction cover of FIG. 3, FIG. 7 is a sectional view of FIG. 3, and FIG. 8 is an enlarged sectional view illustrating a main part of FIG. 7. As illustrated in FIGS. 6 and 7, the wire spring 760 may include, for example, a plurality of linear portions L spaced apart from one another in parallel, and a plurality of curved portions C each connecting two adjacent linear portions L to be elastically deformable.

The wire spring 760 may include, for example, a first wire spring 7601 and a second wire spring 7602 spaced apart from each other. Each of the first wire spring 7601 and the second wire spring 7602 may include the plurality of linear portions L and the plurality of curved portions C.

The wire spring 760 may include a connecting portion 7605 for integrally connecting the first wire spring 7601 and the second wire spring 7602.

The wire spring 760 may be configured such that the first wire spring 7601 and the second wire spring 7602 are symmetrically disposed with each other.

The wire spring 760 may be configured such that the first wire spring 7601 and the second wire spring 7602 are disposed symmetrically with respect to a center line passing through the connecting portion 7605.

A center line passing through the connecting portion 7605 may be disposed to pass through a center O of the case 110, for example. Accordingly, the compression unit 200 can be stably supported with respect to the case 110.

An end portion of the first wire spring 7601 and an end portion of the second wire spring 7602 may be connected to the compression unit 200. Coupling rings 7603 may be provided on the end portion of the first wire spring 7601 and the end portion of the second wire spring 7602, respectively.

The compression unit 200, as illustrated in FIG. 8, may include coupling bosses 4803 to which the first wire spring 7601 and the second wire spring 7602 are coupled, respectively. The coupling bosses 4803 may protrude rearward from the back cover 480, for example. The coupling bosses 4803 may be formed by, for example, deforming a portion of the back cover 480 to protrude rearward. The coupling bosses 4803 may be configured to be coupled to the rear surface of the back cover 480 by welding, for example.

On the other hand, a through portion 4802 through which refrigerant can be suctioned may be provided in the rear end portion of the compression unit 200. The through portion 4802 may be formed through a center of the back cover 480.

The coupling bosses 4803 may be formed around the through portion, for example.

A suction cover 850 defining a suction flow path 8506 of refrigerant may be provided on the rear end portion of the compression unit 200. The suction cover 850 may be made of, for example, a synthetic resin member.

The suction cover 850 may include, for example, a cylindrical part 8501 surrounding a circumference of the through portion 4802, and a radial section 8502 extending in a radial direction from the cylindrical part 8501.

One side of the cylindrical part 8501 may be formed to be open, and the open side may be coupled to be in contact with the back cover 480.

The cylindrical part 8501 may have an enlarged inner diameter compared to the through portion 4802.

The cylindrical part 8501 may define an inner space so that a relatively large amount of refrigerant can be temporarily stored in a region around the through portion 4802.

A radial section 8502 may be formed on one side of the cylindrical part 8501. An end portion of the radial section 8502 may have a length corresponding to a circumference (edge) of the back cover 480.

The suction cover 850 may include a shaft section 8503 bent from an end portion of the radial section 8502. The shaft section 8503 may be, for example, disposed on an outer surface of the stator cover coupling portion 4801 extending from the back cover 480 to the stator cover 440. Flow paths of the refrigerant may be defined in the shaft section 8503 and the radial section 8502, respectively.

The shaft section 8503 may be provided with an inlet member 8504 extending toward the inner surface of the case 110 in the radial direction of the case 110. The inlet member 8504 may be made of, for example, a synthetic resin member.

The inlet member 8504 may have, for example, one end portion connected to the suction cover 850 (the shaft section 8503) and another end portion disposed toward the inner surface of the case 110. The one end portion of the inlet member 8504 may have the same diameter and may be coupled to the suction cover 850. The another end portion of the inlet member 8504 may be implemented in a funnel shape in which inner and outer diameters gradually increase in its protruding direction.

The inlet member 8504 may be spaced apart from the inner surface of the case 110 by a preset distance. This structure can prevent the inlet member 8504 from colliding with the inner surface of the case 110 when the compression unit 200 moves.

The inlet member 8504, for example, may be installed to face the suction pipe 130. The refrigerant suctioned into the case 110 through the suction pipe 130 may be introduced into the shaft section 8503 via the inlet member 8504. The refrigerant introduced into the shaft section 8503 may move in the axial direction and then radially move along the radial section 8502. The refrigerant moved along the radial section 8502 may be temporarily stored in the cylindrical part 8501 and be then suctioned into the suction muffler 260 through the through portion 4802. The suction flow path 8506 of the refrigerant may be formed in the inlet member 8504, the shaft section 8503, the radial section 8502, and the cylindrical part 8501.

The suction cover 850 may be provided to cover one region of the wire spring 760.

Referring to FIG. 6, draw-out portions 85051 may be formed by cutting an upper region of the suction cover 850 such that the first wire spring 7601 and the second wire spring 7602 can be drawn out, respectively.

The suction cover 850 may include coupling boss blocking parts 8505 coupled to block the coupling bosses 4803.

Each of the coupling boss blocking parts 8505 may protrude outward from the cylindrical part 8501. The coupling boss blocking parts 8505 may be coupled to surround the coupling bosses 4803 at the rear of the coupling bosses 4803 along the axial direction. The draw-out portions 85051 through which the first wire spring 7601 and the second wire spring 7602 are drawn out may be formed by cutting off the coupling boss blocking parts 8505, respectively. In this implementation, the draw-out portions 85051 may be formed by, for example, cutting off the upper ends of the coupling boss blocking parts 8505, respectively.

The suction cover 850 may be coupled to the compression unit 200 by a fixing member 8510. A washer 8511 may be provided between the fixing member 8510 and the suction cover 850.

As illustrated in FIG. 7, the suction cover 850 may be provided with a plurality of fixing member coupling portions 8508 through which the fixing members 8510 can be coupled. Some (e.g., one or two) of the fixing member coupling portions 8508 may be provided with insertion holes 8508 formed through the coupling boss blocking parts 8505, respectively.

At least one of the fixing member coupling portions 8508 may be formed to protrude from the cylindrical part 8501 in the radial direction. At least one of the fixing member coupling portions 8508 may be brought into contact with the back cover 480 and coupled by the fixing member 4803. At least one of the fixing member coupling portions 8508 may be provided with an insertion hole 8508 formed therethrough such that the fixing member 8510 can be inserted.

As illustrated in FIGS. 6 and 7, the plurality of linear portions L of each of the first wire spring 7601 and the second wire spring 7602 may include a first linear portion L1 having a first length l1, a second linear portion L2 having a second length l2 shorter than the first length l1, a third linear portion L3 having the first length l1 or the second length l2, and a fourth linear portion L4 having the second length l2. This implementation exemplarily illustrates the case where the third linear portion L3 has the same first length l1 as the first linear portion L1, but this is only illustrative and the present disclosure may not be limited to this. The third linear portion L3 may alternatively configured to have the second length l2.

In the implementation, the second linear portion L2 may be disposed in parallel below the first linear portion L1, and the third linear portion L3 may be disposed in parallel above the first linear portion L1.

The fourth linear portion L4 may be disposed in parallel above the third linear portion L3.

The plurality of curved portions C may include a first curved portion C1 connecting the first linear portion L1 and the second linear portion L2, a second curved portion C2 connecting the first linear portion L1 and the third linear portion L3, and a third curved portion C3 connecting the third linear portion L3 and the fourth linear portion L4.

A coupling ring 7603 may be provided on each second linear portion L2.

The coupling ring 7603 may be spaced apart from an end portion of the second linear portion L2, and may be implemented in a circular ring shape with one side open.

The connecting portion 7605 may be connected to the fourth linear portion L4 of the first wire spring 7601 and the fourth linear portion L4 of the second wire spring 7602. The connecting portion 7605 may be supported by a fixing bracket 790 provided on the case 110.

On the other hand, the coupling ring 7603 connected to the second linear portion L2 of the first wire spring 7601 and the coupling ring 7603 connected to second linear portion L2 of the second wire spring 7602 may be coupled to the coupling bosses 4803, respectively.

As illustrated in FIG. 8, the coupling bosses 4803 may protrude from the rear of the back cover 480. Vibration insulating members 770 for insulating vibration may be coupled between the coupling bosses 4803 and the coupling rings 7603, respectively.

The vibration insulating member 770 may be made of, for example, a rubber member.

The vibration insulating member 770 may have a cylindrical shape.

The vibration insulating member 770 may have an inner diameter corresponding to an outer diameter of the coupling boss 4803.

The vibration insulating member 770 may have an outer diameter larger than an inner diameter of the coupling ring 7603, for example. A concave portion 7701 to which the coupling ring 7603 is coupled may be recessed in an outer surface of the vibration insulating member 770 in the radial direction.

The suction cover 850 (the coupling boss blocking parts 8505) may be coupled to the outer surfaces of the coupling bosses 4803.

Each of the coupling bosses 4803 may be provided with a female screw portion 48031 to which a male screw portion of the fixing member 8510 can be screwed.

The insertion hole 8508 of each coupling boss blocking part 8505 of the suction cover 850 may communicate with the female screw portion 48031. Accordingly, the fixing member 8510 inserted through the insertion hole 8508 of the coupling boss blocking part 8505 may be screwed to the female screw portion of the coupling boss 4803, thereby preventing the wire spring 760 from being unexpectedly separated from the coupling boss 4803. The end portion of the coupling boss 4803 and the end portion of the vibration insulating member 770 may be brought into contact with the inner surface of the coupling boss blocking part 8505, respectively, thereby preventing the vibration insulating member 770 and the coupling ring 7603 of the wire spring 760 from being separated backwards.

On the other hand, the wire spring 760 may be supported by the case 110.

In the wire spring 760, the connecting portion 7605 by which the first wire spring 7601 and the second wire spring 7602 are connected to each other may be supported by the case 110.

The fixing bracket 790 for fixedly supporting the wire spring 760 may be provided on the case 110.

The fixing bracket 790 may be fixedly coupled, for example, to the inner surface of the case 110. For example, the fixing bracket 790 may be welded on the inner surface of the case 1101.

Figure 9:
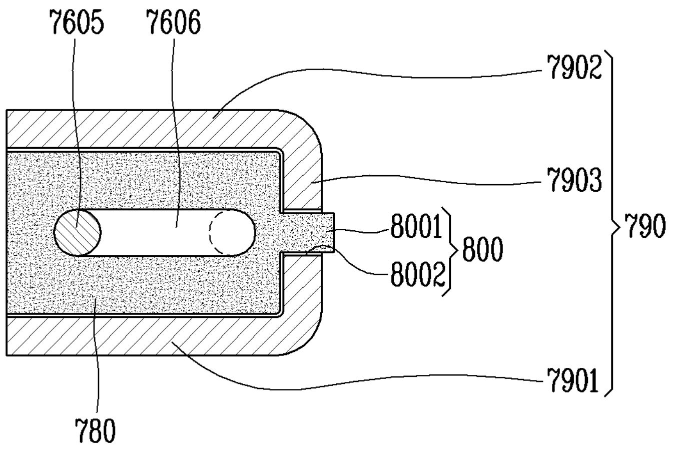
FIG. 9 is a lateral sectional view illustrating a coupled state between a fixing bracket and a vibration insulating member of FIG. 6.
Figure 10:
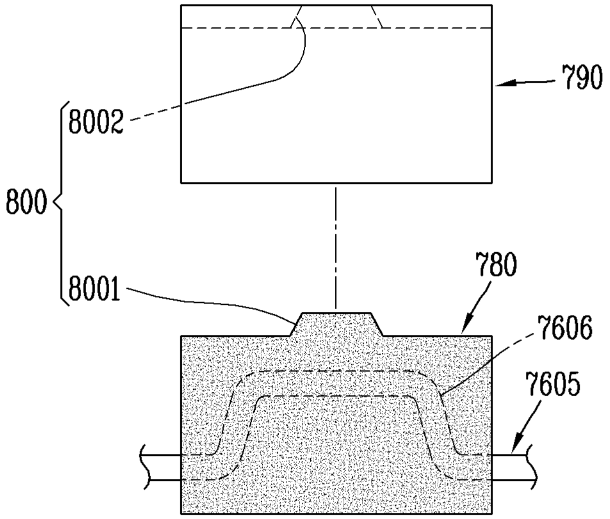
FIG. 10 is a view illustrating a state before coupling the fixing bracket and the vibration insulating member of FIG. 9.
Figure 11:
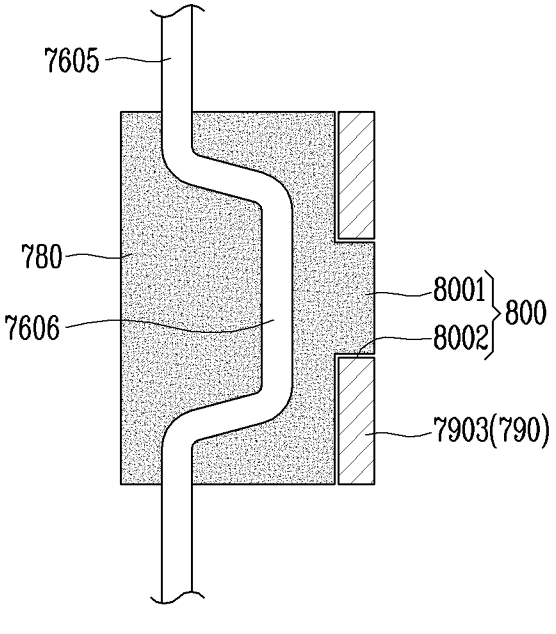
FIG. 11 is a planar sectional view of FIG. 9.

FIG. 9 is a lateral sectional view illustrating a coupled state between the fixing bracket and the vibration insulating member of FIG. 6, FIG. 10 is a view illustrating a state before coupling the fixing bracket and the vibration insulating member of FIG. 9, and FIG. 11 is a planar sectional view of FIG. 9. As illustrated in FIGS. 9 to 11, the fixing bracket 790 may be formed in a shape with a cross-section like "U", which has one side open. The fixing bracket 790, for example, may be coupled to the inner surface of the case 110 in a manner that its opening faces the front of the compressor 100.

The fixing bracket 790 may include an inner surface portion 7901 and an outer surface portion 7902 arranged in parallel with each other, and a connecting end portion 7903 connecting the inner surface portion 7901 and the outer surface portion 7902. Here, the outer surface portion 7902, for example, may be in surface-contact with the inner surface of the case 110. The outer surface portion 7902 may be welded on the inner surface of the case 110.

On the other hand, the connecting portion 7605 of the wire spring 760 may be provided with a vibration insulating member 780 that prevents vibration of the wire spring 760 from being transferred to the fixing bracket 790.

The vibration insulating member 780 may be made of, for example, a rubber member.

The vibration insulating member 780 may be slidably coupled into the fixing bracket 790. The vibration insulating member 780 may be formed in a rectangular parallelepiped shape, for example.

The vibration insulating member 780 may be manufactured by, for example, injection molding after inserting the connecting portion 7605 of the wire spring 760 into a mold.

The connecting portion 7605 of the wire spring 760 may have an anti-rotation section 7606 that prevents the wire spring 760 from rotating relative to the case 110 after the wire spring 760 is coupled to the compression unit 200.

The anti-rotation section 7606, for example, may protrude horizontally in a lengthwise direction of the connecting portion 7605, as illustrated in FIG. 11.

The vibration insulating member 780 may surround the anti-rotation section 7606.

Referring to FIG. 9, the outer surface of the vibration insulating member 780 may have preset thicknesses in front, rear, lower and upper sides from the anti-rotation section 7606 so as to surround the anti-rotation section 7606.

The wire spring 760 and the fixing bracket 790 may be spaced apart by the thicknesses, which may prevent the parts from being in direct contact with each other. This may result in suppressing vibration of the wire spring 760 from being transferred to the fixing bracket 790.

The vibration insulating member 780 may be slidably coupled to the fixing bracket 790.

The vibration insulating member 780 may be press-fitted into the fixing bracket 790.

The vibration insulating member 780 may have a thickness corresponding to a width between the inner surface portion 7901 and the outer surface portion 7902 of the fixing bracket 790.

An engagement part 800 may be provided between the vibration insulating member 780 and the fixing bracket 790 to prevent movement after coupling.

The engagement part 800 may include, for example, a protrusion 8001 protruding from one of contact surfaces between the vibration insulating member 780 and the fixing bracket 790, and a protrusion accommodating portion 8002 formed in another one of the contact surfaces to accommodate the protrusion 8001.

The protrusion 8001 may protrude from the vibration insulating member 780, for example.

The protrusion 8001 may protrude from a rear end portion of the vibration insulating member 780, for example.

The protrusion accommodating portion 8002 may be formed in the fixing bracket 790.

The protrusion accommodating portion 8002 may be formed through the connecting portion 7903 of the fixing bracket 790.

With this configuration, when the rear support unit 750 is to be installed, the coupling ring 7603 of the first wire spring 7601 and the coupling ring 7603 of the second wire spring 7602 may be coupled to the vibration insulating members 780, respectively, and the vibration insulating members 780 may be coupled to the coupling bosses 4803, respectively.

The suction cover 850 may be coupled at the rear of the compression unit 200. The fixing members 8510 may be coupled through the suction cover 850 and the compression unit 200, respectively, such that the suction cover 850 and the compression unit 200 can be coupled to each other.

Next, the vibration insulating member 780 may be inserted into the fixing bracket 790 from the front to rear of the fixing bracket 790. The vibration insulating member 780 may be press-fitted with a preset interference into the fixing bracket 790. When the vibration insulating member 780 is coupled to the fixing bracket 790, the rear end portion of the compression unit 200 may be suspended and supported by the first wire spring 7601 and the second wire spring 7602. The front end portion of the compression unit 200 may be elastically supported by the pair of front springs 7101.

When the installation of the rear support unit 750 is completed, a cover may be coupled to the rear opening of the case 110.

On the other hand, when the compressor is turned on and power is applied to the stator 410, the mover 430 may reciprocate in the axial direction by the interaction between the magnetic field formed by the stator coil 416 and the magnetic field of the permanent magnets 432 of the mover 430.

When the piston 230 moves backward, the suction ports 234 may be opened such that the refrigerant is suctioned into the compression space 220. When the piston 230 moves forward, the refrigerant in the compression space 220 may be compressed.

When internal pressure of the compression space 220 reaches a preset pressure, the discharge valve 217 may open the discharge port 212 of the cylinder 210, and the refrigerant compressed in the compression space 220 may be discharged into the discharge space 282. The refrigerant in the discharge space 282 may flow into the first discharge space 2821, the second discharge space 2822, and the third discharge space 2823.

A part of the refrigerant flowing into the third discharge space 2823 may be discharged out of the case 110 through the discharge pipe 135 via the loop pipe 285. Another part of the refrigerant in the third discharge space 2823 may flow along the first refrigerant moving channel 522 and the second refrigerant moving channel 290 to be introduced into the inlet 292. The refrigerant introduced into the inlet 292 may be sprayed into a gap between the inner curved surface of the cylinder 210 and the outer curved surface of the piston 230 through the nozzles 294. Accordingly, friction between the inner curved surface of the cylinder 210 and the outer curved surface of the piston 230 can be significantly reduced.

On the other hand, when the piston 230 is moved back and forth, a reaction force of the front spring 7101 at the front of the compression unit 200 and a reaction force of the wire spring 760 at the rear of the compression unit 200 may interact with each other, thereby minimizing a rotational moment transmitted to the case 110. The minimization of the rotational moment of the case 110 caused due to the back and forth movement of the piston 230 may result in remarkably reducing an occurrence of vibration of the case 110 in up and down directions due to the rotational moment of the case 110.

Accordingly, noise due to the vibration of the case 110 can be reduced, which may allow the compressor 100 according to the implementation to be operated quietly.

Figure 12:
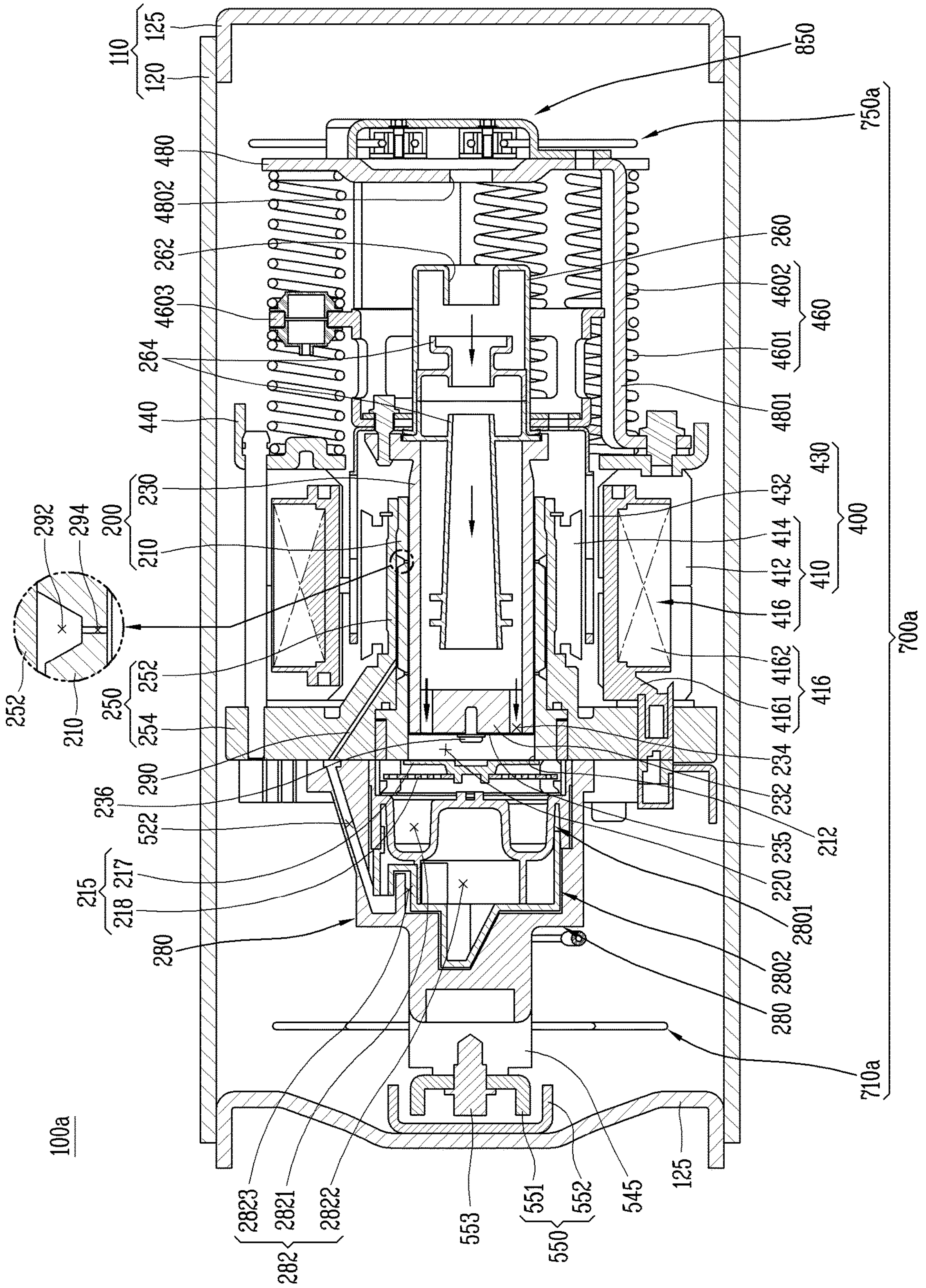
FIG. 12 is a sectional view of a compressor in accordance with another implementation of the present disclosure.
Figure 13:
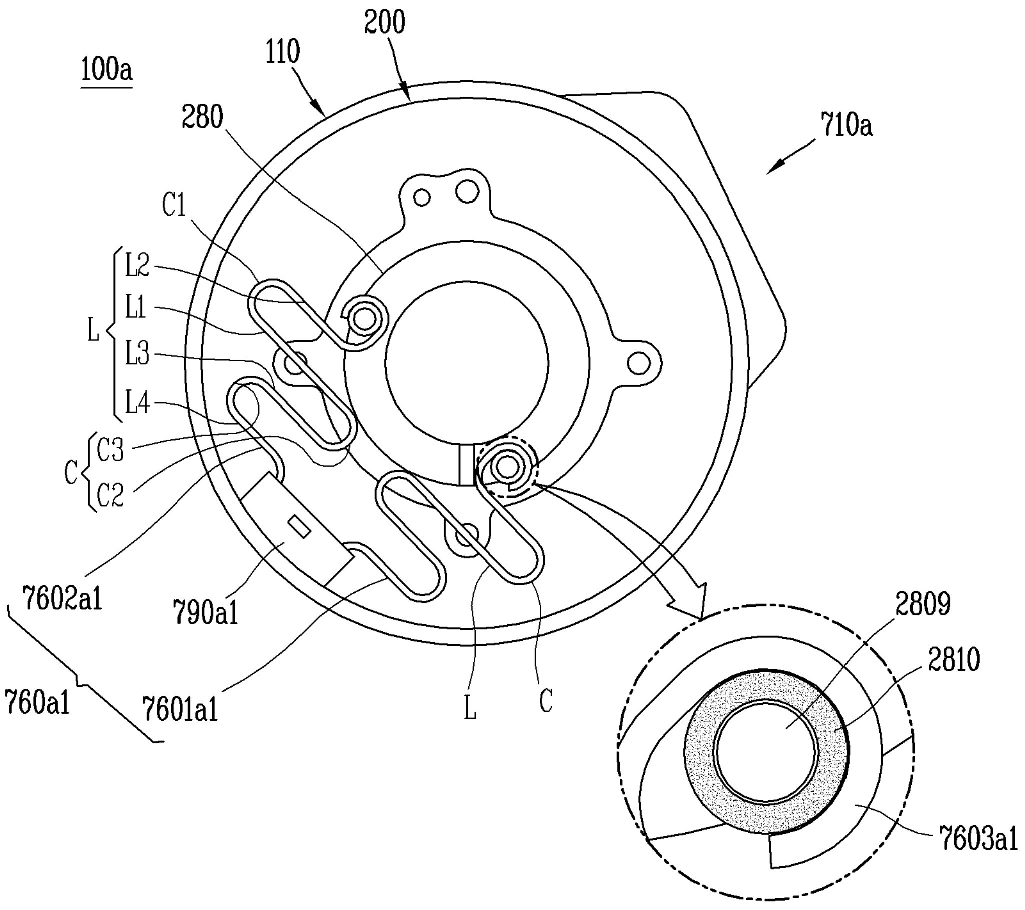
FIG. 13 is a lateral sectional view of a front support unit of FIG. 12.
Figure 14:
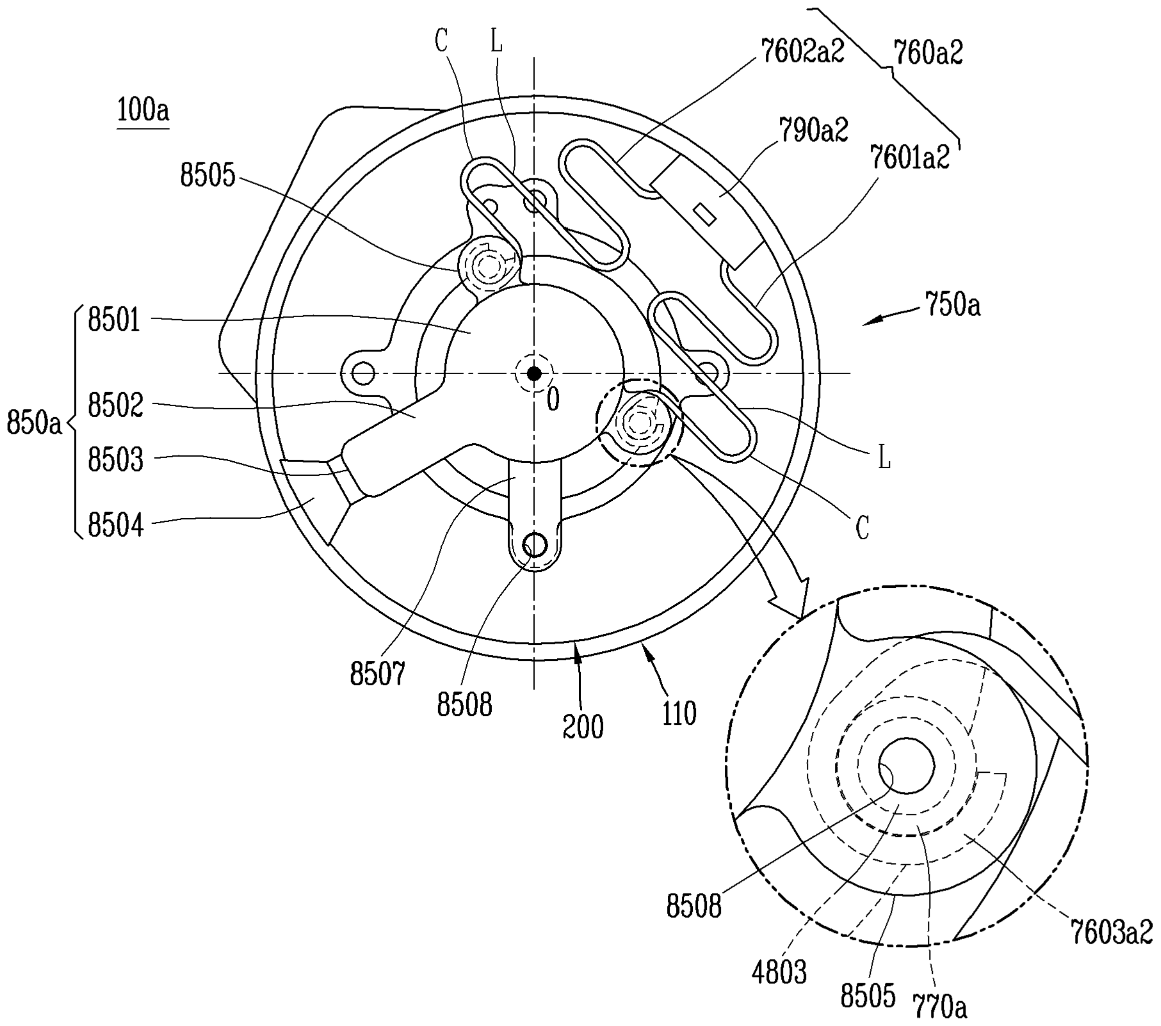
FIG. 14 is a lateral sectional view of a rear support unit of FIG. 12.
Figure 15:
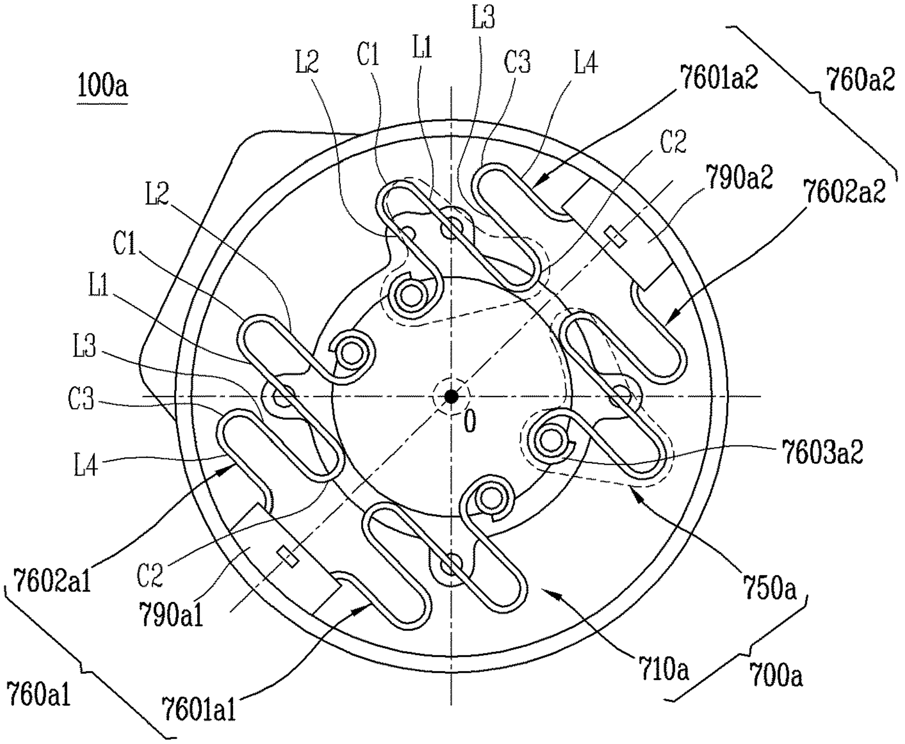
FIG. 15 is a view illustrating a coupled state of the front support unit and the rear support unit of FIG. 12.

FIG. 12 is a sectional view of a compressor in accordance with another implementation of the present disclosure, FIG. 13 is a lateral sectional view of a front support unit of FIG. 12, FIG. 14 is a lateral sectional view of a rear support unit of FIG. 12, and FIG. 15 is a view illustrating a coupled state of the front support unit and the rear support unit of FIG. 12. As illustrated in FIGS. 12 to 15, a compressor 100*a* according to this implementation may include a case 110, a compression unit 200, and a support unit 700*a*.

The case 110 may include, for example, a case body 120 having a cylindrical shape and a cover 125 for blocking both ends of the case body 120.

The compression unit 200 may include, for example, a cylinder 210, a piston 230 having one end portion disposed in the cylinder 210, and a driving unit 400 to make the piston 230 reciprocate in an axial direction.

A frame 250 may be provided on an outer curved surface of the cylinder 210. The frame 250 may include, for example, a body portion 252 coupled to the outer curved surface of the cylinder 210, and a flange portion 254 extending in a radial direction from one end portion of the body portion 252.

The driving unit 400 may include, for example, a stator 410 and a mover 430 reciprocating with respect to the stator 410. The stator 410 may include an outer stator 412 and an inner stator 414 concentrically disposed with each other, and a stator coil 416 wound around the outer stator 412 or the inner stator 414.

The mover 430 may be provided with permanent magnets 432. The permanent magnet 432 may be inserted between the stator coil 416 and the inner stator 414 to perform a reciprocating motion between them.

Meanwhile, the support unit 700*a* may include a front support unit 710*a* provided at a front end portion of the compression unit 200 and a rear support unit 750*a* provided at a rear end portion of the compression unit 200.

The front support unit 710*a* and the rear support unit 750*a* may include, for example, wire springs 760*a*1 and 760*a*2, respectively, each having a plurality of linear portions L spaced apart from one another in parallel and curved portions C each connecting two adjacent linear portions L to be elastically deformable.

Each of the wire springs 760*a*1 and 760*a*2 may include, for example, a first wire spring 7601 and a second wire spring 7602 each having the plurality of linear portions L and curved portions C and symmetrically disposed with each other.

Each of the wire springs 760*a*1 and 760*a*2 may include a connecting portion 7605 for connecting the first wire spring 7601 and the second wire spring 7602.

The wire spring 760*a*1 of the front support unit 710*a* may be referred to as a front wire spring 760*a*1 for convenience of description, and the wire spring 760*a*2 of the rear support unit 750*a* may be referred to as a rear wire spring 760*a*2.

Each of connecting portions 7605*a*1 and 7605*a*2 of the front wire spring 760*a*1 and the rear wire spring 760*a*2 may be supported by the case 110.

Supporting positions of the respective connecting portions 7605*a*1 and 7605*a*2 of the front wire spring 760*a*1 and the rear wire spring 760*a*2 may be formed at positions spaced apart from each other by 180 degrees in the circumferential direction of the case 110.

As a result, when the piston 230 is moved back and forth, the reaction force of the front wire spring 760*a*1 and the reaction force of the rear wire spring 760*a*2 may interact with each other, thereby minimizing the rotational moment transferred to the case 110 due to the back and forth movement of the piston 230. This may result in preventing vibration from being caused in up and down directions due to the rotational moment of the case 110.

The case 110 may include a fixing bracket 790*a* for fixedly supporting the connection portion 7605*a*1 of the front wire spring 760*a*1, and a fixing bracket 790*a* for fixedly supporting the connecting portion 7605 of the rear wire spring 760*a*2.

Referring to FIGS. 13 and 15 together, the front wire spring 760*a*1 may include a first wire spring 7601*a*1 and a second wire spring 7602*a*1 symmetrically disposed to each other.

The front wire spring 760*a*1 (the first wire spring 7601*a*1 and the second wire spring 7602*a*1) may include, for example, a first linear portion L1 having a first length l1, a second linear portion L2, a third linear portion L3, and a fourth linear portion L4 each having a second length l2.

The second linear portion L2 may be disposed above the first linear portion L1 and the third linear portion L3 may be disposed below the first linear portion L1. The fourth linear portion L4 may be disposed below the third linear portion L3.

A coupling ring 7603*a*1 having a circular ring shape may be provided on the second linear portion L2.

The plurality of curved portions C may include a first curved portion C1 connecting the first linear portion L1 and the second linear portion L2, a second curved portion C2 connecting the first linear portion L1 and the third linear portion L3, and a third curved portion C3 connecting the third linear portion L3 and the fourth linear portion L4.

A coupling boss 2809 to which the coupling ring 7603*a*1 of the front wire spring 760*a*1 is coupled may be provided on the front end portion (discharge cover 280) of the compression unit 200. A vibration insulating member 2810 may be inserted between the coupling boss 2809 and the coupling ring 7603. Accordingly, vibration of the compression unit 200 can be suppressed from being transferred to the front wire spring 760*a*1. In the implementation, a front region of each coupling ring 7603*a*1 of the front wire spring 760*a*1 may be blocked by a support guide 545 that is coupled to the front end portion of the discharge cover 280. This may prevent the coupling ring 7603*a*1 from being separated forward from the coupling boss 2809.

The fourth linear portion L4 of the first wire spring 7601*a*1 and the fourth linear portion L4 of the second wire spring 7602*a*1 of the front wire spring 760*a*1 may be integrally connected by a connecting portion 7605*a*.

A connecting portion 7605*a*1 of the front wire spring 760*a*1 may be supported by a front fixing bracket 790*a*1.

A vibration insulating member 780*a*1 may be provided between the front fixing bracket 790*a*1 and the connecting portion 7605*a*1 of the front wire spring 760*a*1

The front fixing bracket 790*a*1 may be disposed, for example, at a position spaced apart from a center of a lower end of the case 110 by approximately 40 to 60 degrees in a clockwise direction along the circumferential direction.

As illustrated in FIGS. 14 and 15, the rear wire spring **760*a*2 may be implemented in the same shape as the front wire spring 760*a*1**.

More specifically, the rear wire spring **760*a*2 may include a first wire spring 7601*a*2 and a second wire spring 7602*a*2** symmetrically disposed with each other.

The rear wire spring **760*a*2 may include a connecting portion 7605*a*2 for connecting the first wire spring 7601*a*2 and the second wire spring 7602*a*2**.

The rear wire spring **760*a*2 may include a first linear portion L1 having a first length l1, a second linear portion L2, a third linear portion L3, and a fourth straight line portion L4 each having a second length l2. A coupling ring 7603*a*2 may be provided on each second linear portion L2 of the rear wire spring 760*a*2**.

The coupling ring **7603*a*2 of the rear wire spring 760*a*2 may be coupled to a coupling boss 4803 formed on the rear end portion (the back cover 480) of the compression unit 200. A vibration insulating member 780*a*2 provided between the coupling boss 4803 formed on the back cover 480 and the coupling ring 7603*a*2 of the rear wire spring 760*a*2**.

The rear wire spring **760*a*2 may be supported by a rear fixing bracket 790*a*2**.

The rear fixing bracket **790*a*2 may be disposed at a position spaced apart from an upper center of the case 110** by 40 degrees to 60 degrees in a clockwise direction.

The front fixing bracket **790*a*1 and the rear fixing bracket 790*a*2 may be fixed respectively at positions spaced apart by 180 degrees in the circumferential direction of the case 110**.

The vibration insulating member **780*a*2 may be provided on the connecting portion 7605*a*2 of the rear wire spring 760*a*2. Accordingly, vibration of the rear wire spring 760*a*2 can be suppressed from being transferred to the rear fixing bracket 790*a*2**.

As illustrated in FIG. 14, a suction cover **850*a* may be provided on the rear end portion of the compression unit 200. The suction cover 850*a* may include a cylindrical portion 8501, a radial section 8502 extending from the cylindrical portion 8501 in the radial direction, and a shaft section 8503 bent in the axial direction. The suction cover 850*a* may be provided with an inlet member 8504 disposed to face the suction pipe 130. The suction cover 850*a* may be provided with a coupling boss blocking part 8505 coupled to block a rear end portion of the coupling boss 4803. The configuration of the suction cover 850*a* according to implementation is similar to the configuration of the suction cover 850 described above in relation to FIGS. 1 to 11 only except for the positions of the coupling boss blocking part 8505 and the fixing member coupling portion 8507**.

Figure 16:
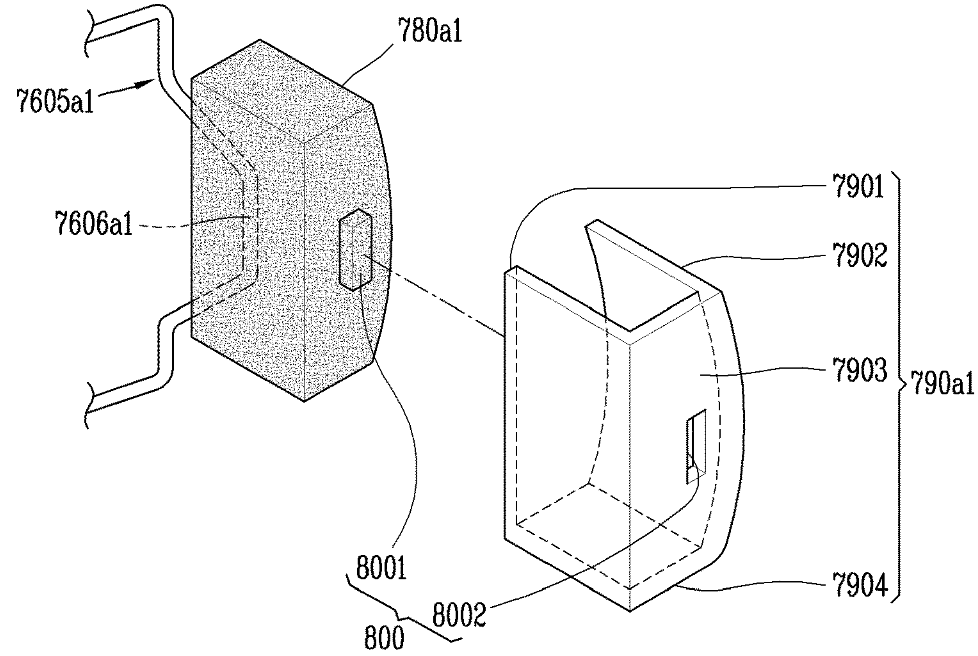
FIG. 16 is a perspective view illustrating a state before coupling the fixing bracket and the vibration insulating member of FIG. 13.
Figure 17:
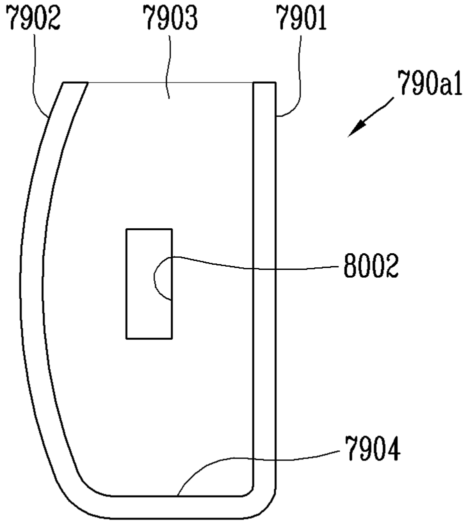
FIG. 17 is a front view of the fixing bracket of FIG. 16.
Figure 18:
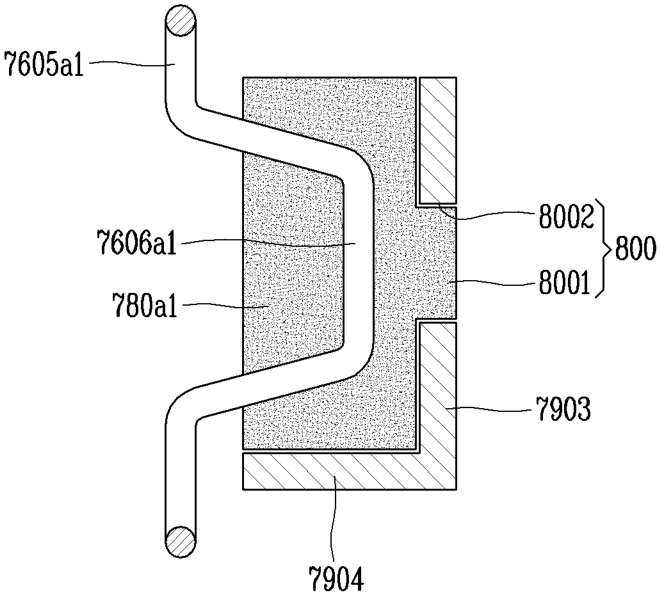
FIG. 18 is a sectional view illustrating a coupled state of the fixing bracket and the vibration insulating member of FIG. 16.

FIG. 16 is a perspective view illustrating a state before coupling the fixing bracket and the vibration insulating member of FIG. 13, FIG. 17 is a front view of the fixing bracket of FIG. 16, and FIG. 18 is a sectional view illustrating a coupled state of the fixing bracket and the vibration insulating member of FIG. 16. In this implementation, the configuration of the rear fixing bracket **790*a*2, the connecting portion 7605*a*2 of the rear wire spring 760*a*2, and the vibration insulating member (not shown) is similar to the configuration of the front fixing bracket 790*a*1, the connecting portion 7605*a*1 of the front wire spring 760*a*1, and the vibration insulating member 780*a*1. Thus, a detailed description of the configuration will be omitted and replaced with the description of the configuration of the front fixing racket 790*a*1, the connecting portion 7605*a*1 of the front wire spring 760*a*1, and the vibration insulating member 780*a*1**.

As illustrated in FIGS. 16 to 18, the front fixing bracket **790*a*1 may be formed in a shape with a cross-section like "U", which has one side open. The front fixing bracket 790*a*1 may be installed with the opening facing the rear side. The connecting portion 7605*a*1 of the front wire spring 760*a*1 may be inserted into the front fixing bracket 790*a*1 from the rear to front of the front fixing bracket 790*a*1**.

The front fixing bracket **790*a*1 may include an inner surface portion 7901, an outer surface portion 7902 disposed at an outer side of the inner surface portion 7901, and a connecting end portion 7903 connecting the inner surface portion 7901 and the outer surface portion 7902. In the implementation, the front fixing bracket 790*a*1 may further include a blocking portion 7904 for blocking lower end portions of the inner surface portion 7901 and the outer surface portion 7902. This structure may prevent the vibration insulating member 780*a*1, which is inserted into the front fixing bracket 790*a*1** from being separated downward.

The connecting portion **7605*a*1 of the front wire spring 760*a*1 may be provided with an anti-rotation section 7606*a*1 for preventing the first wire spring 7601*a*1 and the second wire spring 7602*a*1 from being rotated relative to the case 110**.

The vibration insulating member **780*a*1 may surround the anti-rotation section 7606*a*1**.

Since the vibration insulating member **780*a*1 is inserted into the front fixing bracket 790*a* with surrounding the anti-rotation section 7606*a*1, vibration of the front wire spring 760*a*1 can be prevented from being transferred to the front fixing bracket 790*a*1 through the connecting portion 7605*a*1 and also the compression unit 200 can be prevented from being moved (rotated) in the back and forth directions of the case 110**.

The vibration insulating member **780*a*1 and the front fixing bracket 790*a*1 of the front wire spring 760*a*1 may be coupled to be slidable relative to each other. The vibration insulating member 780*a*1 may be press-fitted into the front fixing bracket 790*a*1**.

An engagement part 800 may be provided between the vibration insulating member **780*a*1 and the front fixing bracket 790*a*1** to prevent movement after coupling.

The engagement part 800 may include, for example, a protrusion 8001 protruding from one of contact surfaces between the vibration insulating member **780*a*1 and the front fixing bracket 790*a*1, and a protrusion accommodating portion 8002 formed in another one of the contact surfaces to accommodate the protrusion 8001**.

With this configuration, when the front support unit **710*a* is to be coupled to the compression unit 200, each coupling ring 7603*a*1 of the front wire spring 760*a*1 may be coupled to the coupling boss 4803 of the discharge cover 280 with the vibration insulating member 770*a*1** interposed therebetween.

When the rear wire spring **760*a*2 is coupled to the rear end portion of the compression unit 200, each coupling ring 7603*a*2 of the rear wire spring 760*a*2 may be coupled to the coupling boss 4803 of the back cover 480 with the vibration insulating member 770*a*2 interposed therebetween. Then, the suction cover 850*a* may be coupled to the rear end portion of the compression unit 200. Accordingly, each coupling ring 7603*a*2 of the rear wire spring 760*a*2** can be suppressed from being separated backward.

Next, the vibration insulating members 780 of the front wire spring **760*a*1 and the rear wire spring 760*a*2 may be inserted into the front fixing bracket 790*a*1 and the rear fixing bracket 790*a*2, respectively. Accordingly, the compression unit 200 can be elastically supported with being spaced apart from the inner wall surface of the case 110. After the compression unit 200 is installed, the inner space of the case 110** may be sealed.

On the other hand, when the operation is started and power is applied to the stator coil 416, the mover 430 may reciprocate along the axial direction together with the piston 230. Accordingly, refrigerant suctioned into the case 110 through the suction pipe 130 may be compressed in the compression space 220 and discharged to the discharge space 282. A part of the refrigerant flowing into the discharge space 282 may be discharged out of the case 110 through the discharge pipe 135 via the loop pipe 285. Another part of the refrigerant in the discharge space 282 may be moved into the inlet 292 through the first refrigerant moving channel 522 and the second refrigerant moving channel 290, and then sprayed into the cylinder 210 through the nozzles 294.

In the implementation, the compression unit 200 may be elastically supported respectively by the front wire spring **760*a*1 and the rear wire spring 760*a*2 that are spaced apart from each other by 180 degrees apart in the circumferential direction of the case 110. When the piston 230 moves back and forth, the rotational moment transmitted to the case 110 can be minimized by the interaction between the reaction force of the front wire spring 760*a*1 and the reaction force of the rear wire spring 760*a*2. This may result in significantly reducing vibration caused in up and down directions due to the rotational moment of the case 110**.

Figure 19:
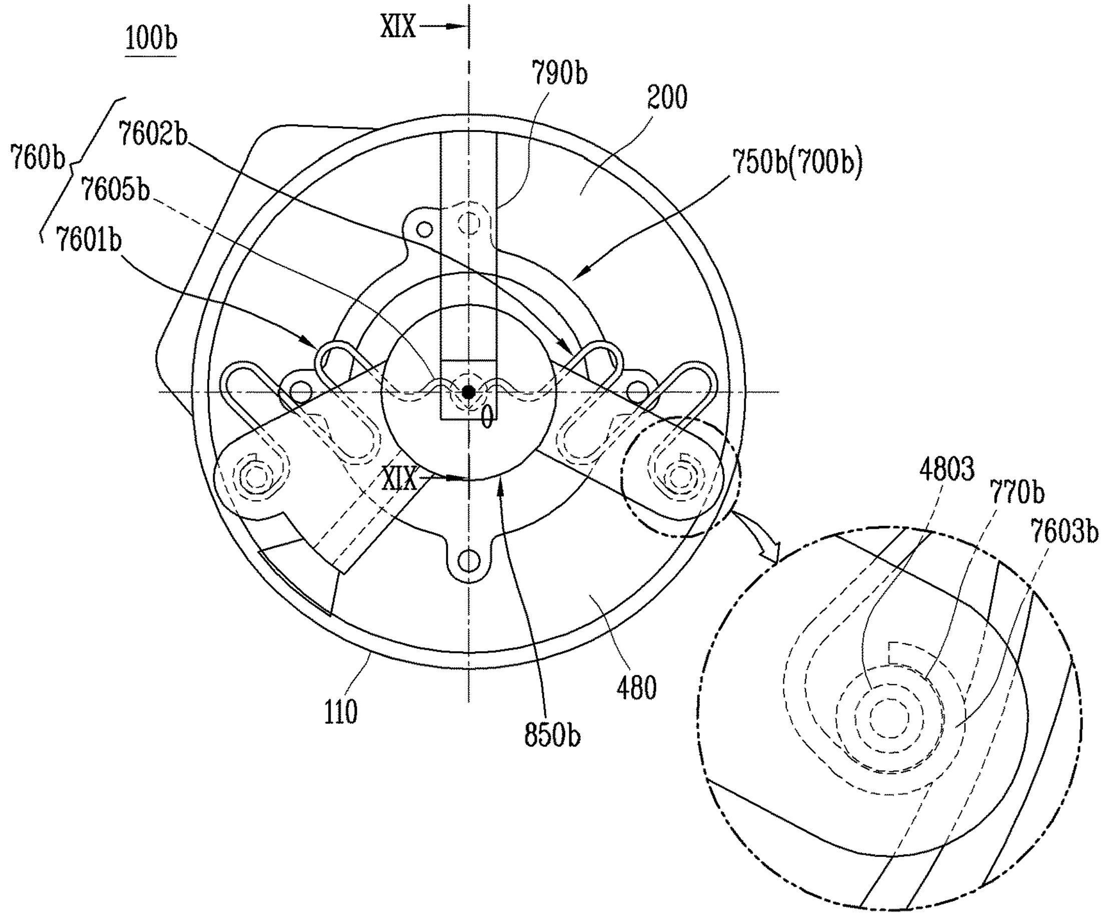
FIG. 19 is a lateral view illustrating a support unit (rear support unit) of a compressor in accordance with another implementation of the present disclosure.
Figure 20:
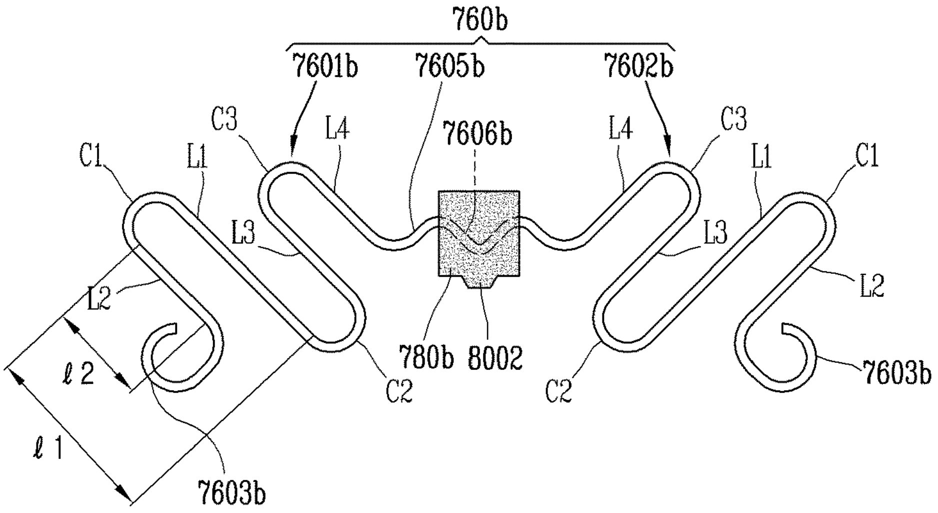
FIG. 20 is a view illustrating the rear support unit of FIG. 19.
Figure 21:
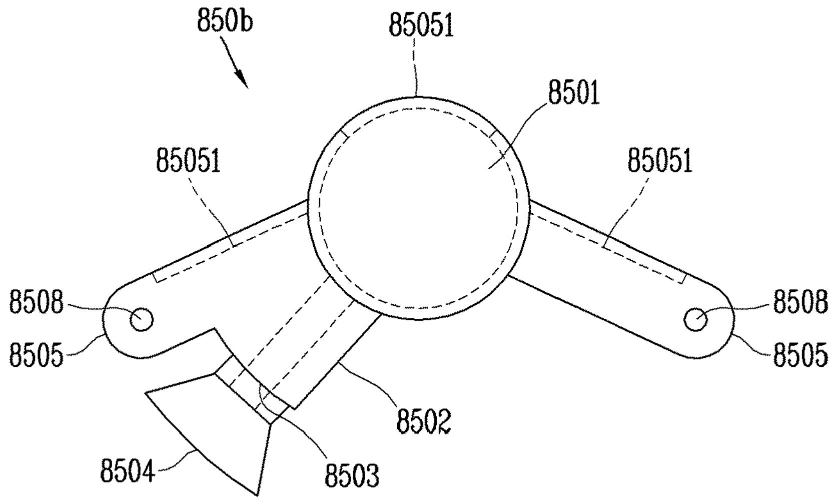
FIG. 21 is a view illustrating a suction cover of FIG. 19.
Figure 22:
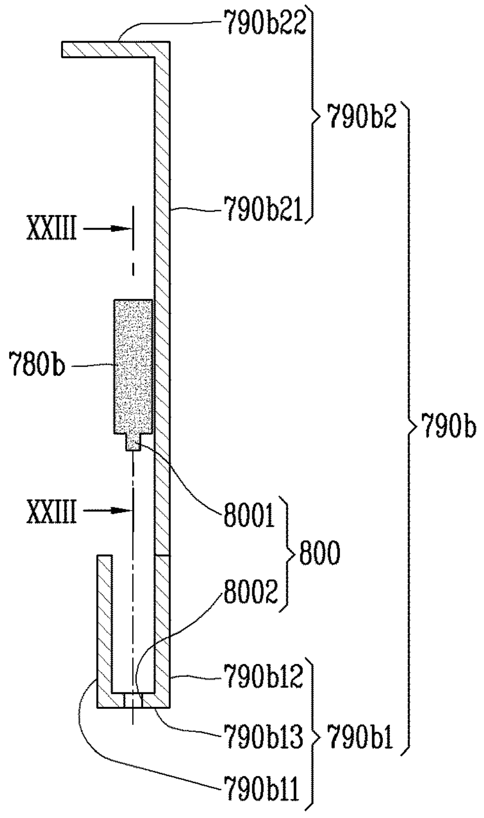
FIG. 22 is a sectional view illustrating a state before coupling a fixing bracket and a vibration insulating member of FIG. 19.
Figure 23:
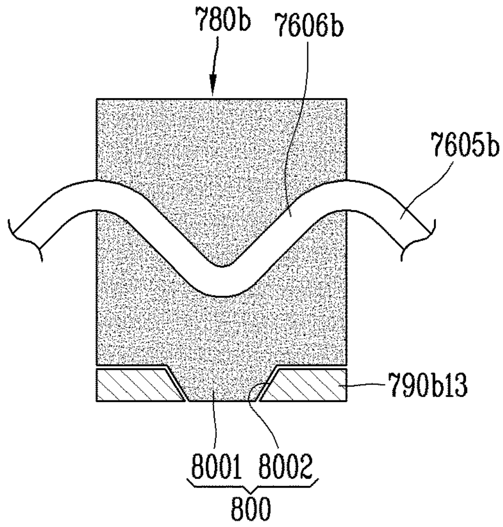
FIG. 23 is a sectional view illustrating a state after coupling the fixing bracket and the vibration insulating member of FIG. 21.

FIG. 19 is a lateral view illustrating a support unit (rear support unit) of a compressor in accordance with another implementation of the present disclosure, FIG. 20 is a view illustrating the rear support unit of FIG. 19, FIG. 21 is a view illustrating a suction cover of FIG. 19, FIG. 22 is a sectional view illustrating a state before coupling a fixing bracket and a vibration insulating member of FIG. 19, and FIG. 23 is a sectional view illustrating a state after coupling the fixing bracket and the vibration insulating member of FIG. 21. The compressor **100*b* according to this implementation may include a case 110, a compression unit 200, and a support unit 700*b***.

The case 110 may include, for example, a case body 120 having a cylindrical shape and a cover 125 for blocking both ends of the case body 120.

The compression unit 200 may include, as aforementioned, a cylinder 210, a piston 230 having one end portion disposed in the cylinder 210, and a driving unit 400 making the piston 230 reciprocate in an axial direction.

A frame 250 may be provided on an outer curved surface of the cylinder 210. The frame 250 may include a body portion 252 coupled to an outer curved surface of the cylinder 210, and a flange portion 254 extending in a radial direction from a front end portion of the body portion 252.

The driving unit 400 may include, as aforementioned, a stator 410 and a mover 430 reciprocating with respect to the stator 410.

On the other hand, as illustrated in FIG. 19, the support unit **700*b* according to this implementation may include a front support unit 710*a* provided at a front end portion of the compression unit 200 and a rear support unit 750*b* provided at a rear end portion of the compression unit 200**.

The front support unit **710*a*, as described in the foregoing implementation with reference to FIGS. 1 to 11, may include a front spring 7101 extending outward from a lower portion of the front end portion (discharge cover 280) of the compression unit 200 to be downwardly inclined. The front support unit 710*a* may be provided with a spring support member 7102 coupled to the bottom of the discharge cover 280. As described above, the spring support member 7102 may include a contact portion 7103 brought into contact with the bottom of the discharge cover 280 and rod portions 7104 extending outward from both end portions of the contact portion 7103** to be downwardly inclined.

On the other hand, the rear support unit **750*b*, as illustrated in FIG. 20, may include a wire spring 760*b*** having a plurality of linear portions L and a plurality of curved portions C each connecting two adjacent linear portions L to be elastically deformable.

The wire spring **760*b* may include a first wire spring 7601*b* and a second wire spring 7602*b* each having the plurality of linear portions L and curved portions C and symmetrically disposed with each other, and a connecting portion 7605*b* integrally connecting the first wire spring 7601*b* and the second wire spring 7602*b***.

The first wire spring **7601*b* and the second wire spring 7602*b* may be symmetrically disposed with respect to a center line passing through the center O of the case 110**.

In this implementation, the first wire spring **7601*b* and the second wire spring 7602*b* may be symmetrically disposed with respect to the center line passing through the center O of the case 110** in the up and down direction.

In the implementation, a suction cover **850*b* defining a suction flow path 8506 of refrigerant may be provided on the rear end portion of the compression unit 200**.

The first wire spring **7601*b* and the second wire spring 7602*b* of the wire spring 760*b* may include a first linear portion L1 having a first length l1, a second linear portion L2, a third linear portion L3, and a fourth linear portion L4** each having a second length l2 shorter than the first length l1.

The second linear portion L2 may be disposed in parallel below the first linear portion L1, and the third linear portion L3 and the fourth linear portion L4 may be disposed above the first linear portion L1.

The plurality of curved portions C may include a first curved portion C1 connecting the first linear portion L1 and the second linear portion L2, a second curved portion C2 connecting the first linear portion L1 and the third linear portion L3, and a third curved portion C3 connecting the third linear portion L3 and the fourth linear portion L4.

Coupling rings **7603*b* coupled to the compression unit 200 may be provided on the second linear portions L2 of the first wire spring 7601*b* and the second wire spring 7602*b*, respectively. Each of the coupling rings 7603*b*** may be formed in a circular ring shape with one side open.

Coupling bosses 4803 that protrude rearward from the rear end portion (the back cover 480) of the compression unit 200 such that the coupling rings **7603*b* of the first wire spring 7601*b* and the second wire spring 7602*b*** can be coupled.

In the implementation, the connecting portion **7605*b* connecting the first wire spring 7601*b* and the second wire spring 7602*b* may be located in a central region of the case 110**.

The connecting portion **7605*b* of the wire spring 760*b* may be fixedly supported by a fixing bracket 790*b***.

The fixing bracket **790*b* may be fixedly coupled to an upper end of an inner surface of the case 110**.

The fixing bracket **790*b* may be welded on the inner surface of the case 110**.

The connecting portion 7605*b* of the wire spring 760*b* may include an anti-rotation section 7606*b* for suppressing rotation of the first wire spring 7601*b* and the second wire spring 7602*b*.

The anti-rotation section 7606*b* may be fixedly supported by the fixing bracket 790*b*.

The anti-rotation section 7606*b* may be disposed, for example, in the up and down direction of the case 110.

The wire spring 760*b* may include a vibration insulating member 780*b* suppressing vibration of the wire spring 760*b* from being transmitted to the fixing bracket 790*b*.

The vibration insulating member 780*b* may surround the anti-rotation section 7606*b*.

The vibration insulating member 780*b* may be made of, for example, a rubber member.

As illustrated in FIG. 21, the suction cover 850*b* may include a cylindrical part 8501, a radial section 8502 extending from one side of the cylindrical part 8501 in the radial direction, and a shaft section 8503 extending from the radial section 8502 in the axial direction. An inlet member 8504 disposed to face the suction pipe 130 may be provided on the shaft section 8503 of the suction cover 850*b*.

The suction cover 850*b* may include coupling boss blocking parts 8505 coupled to block the coupling bosses 4803, respectively.

The coupling boss blocking parts 8505 may include a coupling boss blocking part 8505 blocking the coupling boss 4803 to which the coupling ring of the first wire spring 7601*b* is coupled, and a coupling boss blocking part 8505 blocking the coupling boss 4803 to which the coupling ring of the second wire spring 7602*b* is coupled.

Each of the coupling boss blocking parts 8505 may extend outward from an outer surface of the cylindrical part 8501 (in a left and right direction in the drawing).

The suction cover 850*b* may be provided with a draw-out portion 85051 through which the wire spring 760*b* and the fixing bracket 790*b* can be drawn out. The draw-out portion 85051 may be formed by cutting off an upper surface of the through portion 4802 and an upper surface of each coupling boss blocking part 8505.

Each of the coupling boss blocking parts 8505 may be provided with an insertion hole 8508 formed therethrough such that a fixing member 8510 screwed into the coupling boss 4803 is coupled.

As illustrated in FIG. 22, the fixing bracket 790*b* may include a vibration insulating member coupling part 790*b*1 into which the vibration insulating member 780 of the wire spring 760*b* is inserted, and a case coupling part 790*b*2 extending from the vibration insulating member coupling part 790*b*1 to be coupled to the case 110.

In this implementation, the case coupling part 790*b*2 is coupled to a center of an upper end in the case 110, but this is merely illustrative and the present disclosure may not be limited to this. The case coupling part 790*b*2 may alternatively extend downward from the vibration insulating member coupling part 790*b*1 to be coupled to a center of a lower end in the case 110.

The vibration insulating member coupling part 790*b*1 may be configured such that the vibration insulating member 780*b* is coupled thereto to be slidable up and down, for example.

The vibration insulating member coupling part 790*b*1 may include, for example, an inner surface portion 790*b*11 and an outer surface portion 790*b*12 disposed in a spacing manner with the vibration insulating member 780*b* interposed therebetween, and a blocking portion 790*b*13 blocking lower portions of the inner surface portion 790*b*11 and the outer surface portion 790*b*12.

An engagement part 800 may be disposed between the vibration insulating member 780*b* and the vibration insulating member coupling part 790*b*1 to prevent relative movement after coupling.

As illustrated in FIG. 23, the engagement part 800 may include, for example, a protrusion 8001 protruding from one of contact surfaces between the vibration insulating member 780*b* and the vibration insulating member coupling part 790*b*1, and a protrusion accommodating portion 8002 formed in another one of the contact surfaces to accommodate the protrusion 8001. The protrusion 8001 may protrude downward from a bottom surface of the vibration insulating member 780*b*. The protrusion accommodating portion 8002 may be formed through the blocking portion 790*b*13. This may result in preventing the vibration insulating member 780*b* from moving to both sides (to left and right in the drawing) of the vibration insulating member coupling part 790*b*1.

The case coupling part 790*b*2 may include, for example, an extension section 790*b*21 extending upward from the outer surface portion 790*b*12, and a bent section 790*b*22 bent from an end portion of the extension section 790*b*21. The bent section 790*b*22, for example, may have a curved cross-section so as to be in surface-contact with the inner surface of the case 110. The implementation illustrates the case where the case coupling part 790*b*2 (the extension section 790*b*21) extends upward from the outer surface portion 790*b*12 and does not clearly specify the height of the outer surface portion 790*b*12. The height of the outer surface portion 790*b*12 may be the same as or similar to the height of the inner surface portion 790*b*11.

With this configuration, when the rear support unit 750*b* is to be coupled to the compression unit 200, the coupling ring 7903*b* of the first wire spring 7601*b* and the coupling ring 7603*b* of the second wire spring 7602*b* may be coupled to the coupling bosses 4803 of the back cover 480, respectively, by interposing the vibration insulating members 780*b* therebetween.

Next, the vibration insulating member 780*b* of the wire spring 760*b* may be coupled to the vibration insulating member coupling part 790*b*1 of the fixing bracket 790*b* in a direction from top to bottom. When the vibration insulating member 780*b* is coupled, the protrusion 8001 may be inserted into the protrusion accommodating portion 8002, so that movement of the vibration insulating member 780*b* to left and right can be suppressed.

On the other hand, when the operation is started and power is applied to the stator coil 410, the mover 430 may move and the piston 230 may thusly reciprocate along the axial direction.

When the piston 230 moves, the reaction force of the pair of front springs 7101 of the front support unit 710 and the reaction force of the first wire spring 7601*b* and the second wire spring 7602*b* of the rear support unit 750*b* may interact with each other, thereby reducing the generation of a rotational moment transferred to the case 110 due to the back and forth movement of the piston 230. This may result in significantly reducing vibration of the case 110 in the up and down direction due to the rotational moment. Accordingly, the compressor 100*b* can be operated quietly.

Figure 24:
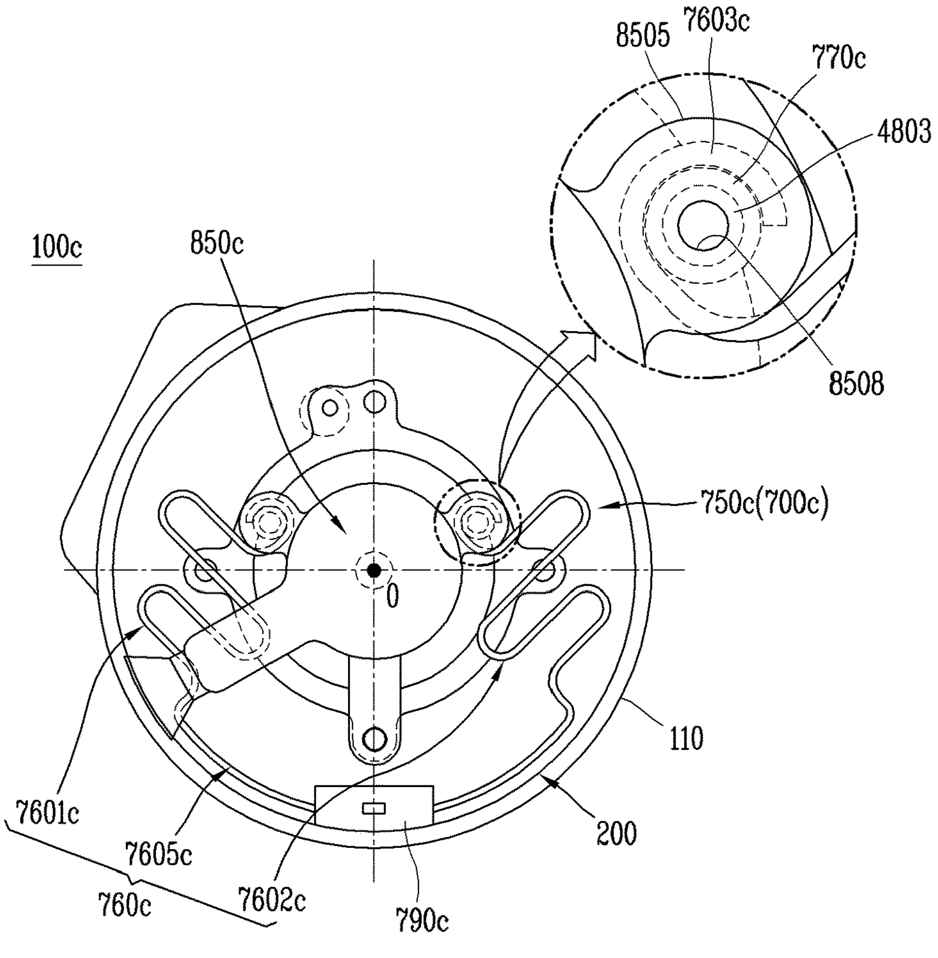
FIG. 24 is a lateral view illustrating a rear support unit of a compressor in accordance with still another implementation of the present disclosure.
Figure 25:
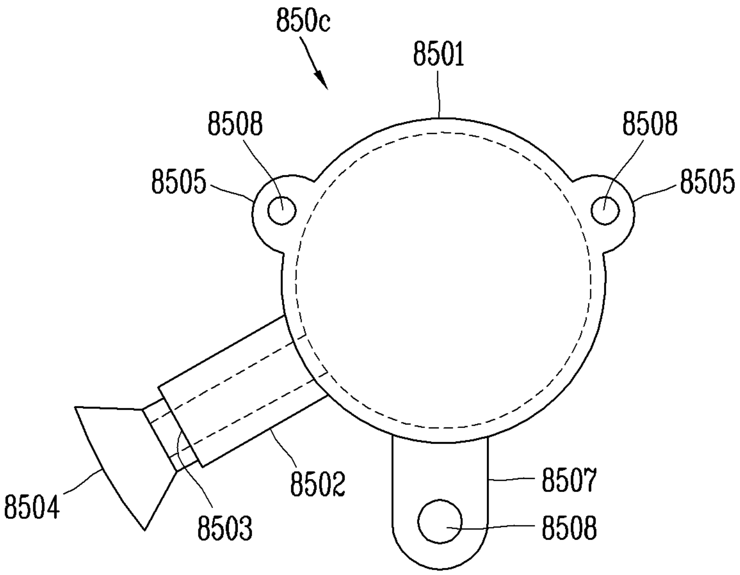
FIG. 25 is a view illustrating a suction cover of FIG. 24.
Figure 26:
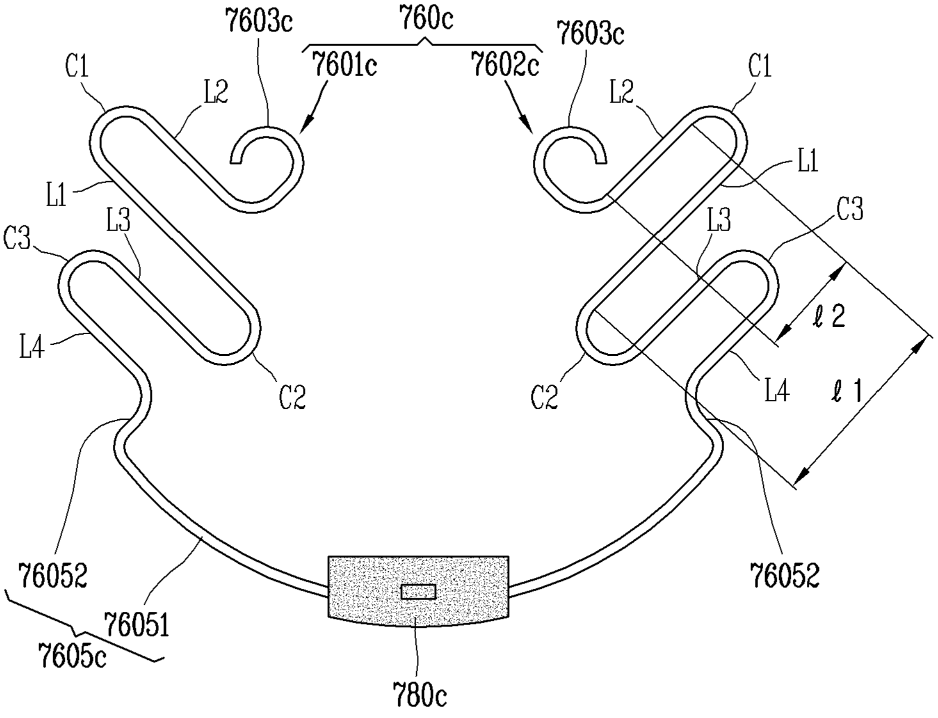
FIG. 26 is a view illustrating the rear support unit of FIG. 24.
Figure 27:
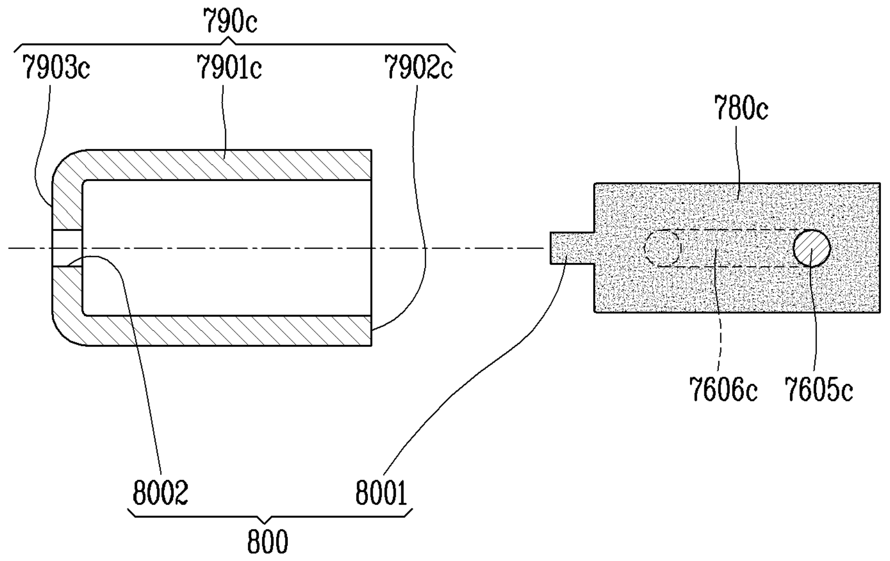
FIG. 27 is a sectional view illustrating a state before coupling the fixing bracket and the vibration insulating member of FIG. 24.

FIG. 24 is a lateral view illustrating a rear support unit of a compressor in accordance with still another implementation of the present disclosure, FIG. 25 is a view illustrating a suction cover of FIG. 24, FIG. 26 is a view illustrating the rear support unit of FIG. 24, and FIG. 27 is a sectional view illustrating a state before coupling a fixing bracket and a vibration insulating member of FIG. 24. As illustrated in FIG. 24, a compressor 100*c* according to the implementation may include a case 110, a compression unit 200, and a support unit 700*c*.

The case 110 may include, for example, a case body 120 having a cylindrical shape and a cover 125 for blocking both ends of the case body 120.

The compression unit 200 may include, for example, a cylinder 210, a piston 230 having one end portion disposed in the cylinder 210, and a driving unit 400 to make the piston 230 reciprocate in an axial direction.

A frame 250 may be provided on a circumference of the cylinder 210. The frame 250 may include a body portion 252 coupled to the circumference of the cylinder 210, and a flange portion 254 extending from a front end portion of the body portion 252.

The driving unit 400 may be disposed at the rear of the frame 250 (the flange portion 254).

The driving unit 400 may include a stator 410 and a mover 430 reciprocating with respect to the stator 410.

A stator cover 440 may be coupled to a rear end portion of the stator 410, and a resonance spring 460 may be disposed at the rear of the stator cover 440. The resonance spring 460 may include a first resonance spring 4601 and a second resonance spring 4602 disposed in the axial direction. A back cover 480 may be provided at the rear of the resonance spring 460 (the second resonance spring 4602). The back cover 480 may be integrally fixed to the stator cover 440.

Meanwhile, the support unit 700*c* may include a front support unit (not shown) provided at a front end portion of the compression unit 200 and a rear support unit 750*c* provided at a rear end portion of the compression unit 200.

The front support unit and the rear support unit 750*c* may be fixedly supported at positions spaced apart by 180 degrees in the circumferential direction of the case 110, for example.

More specifically, for example, in the implementation, the front support unit may be fixedly supported at a center of a lower end of an inner surface of the case 110, and the rear support unit 750*c* may be supported at a center of a lower end of the inner surface of the case 110 spaced apart by 180 degrees in the circumferential direction of the case 110.

The front support unit and the rear support unit 750*c* each may include, for example, a wire spring 760*c* having a plurality of linear portions L spaced apart from one another in parallel and curved portions C each connecting two adjacent linear portions L to be elastically deformable.

For example, the front support unit has a structure similar to the structure of the wire spring 760 of the rear support unit 750 described with reference to FIGS. 1 to 11 or the structure of the wire spring 760*a*2 of the rear support unit 750*a*2 described with reference to FIGS. 12 to 18, so as to be connected to the front end portion (the discharge cover 280) of the compression unit 200 and fixedly supported at the center of the upper end in the case 110. Thus, a detailed description will be omitted.

As illustrated in FIGS. 24 to 26, the rear support unit 750*c* may include a first wire spring 7601*c* and a second wire spring 7602*c* each having the plurality of linear portions L and curved portions C and symmetrically disposed with each other, and a connecting portion 7605*c* integrally connecting the first wire spring 7601*c* and the second wire spring 7602*c*.

In the implementation, the connecting portion 7605*c* may be disposed below the plurality of linear portions L.

In the implementation, the wire spring 760*c* may be fixedly supported at a center of a lower end in the case 110.

The plurality of linear portions L of each of the first wire spring 7601*c* and the second wire spring 7602*c* may include a first linear portion L1 having a first length l1, a second linear portion L2, a third linear portion L3, and a fourth linear portion L4 each having a second length l2 shorter than the first length l1.

The first linear portion L1 may be downwardly inclined toward an inside, and the second linear portion L2 may be provided above the first linear portion L1. The third linear portion L3 may be disposed below the first linear portion L1 and the fourth linear portion L4 may be disposed below the third linear portion L3.

A coupling ring 7603*c* formed in an arcuate shape with one side open may be connected to the second linear portion L2.

The connecting portion 7605*c* may be connected to the fourth linear portions L4.

The plurality of curved portions C of each of the first wire spring 7601*c* and the second wire spring 7602*c* may include, for example, a first curved portion C1 connecting the first linear portion L1 and the second linear portion L2, a second curved portion C2 connecting the first linear portion L1 and the third linear portion L3, and a third curved portion C3 connecting the third linear portion L3 and the fourth linear portion L4.

The connecting portion 7605*c* may include an arcuate section 76051 formed in a substantially arcuate shape to correspond to a shape of the inner surface of the case 110, and a bent section 76052 bent from both end portions of the arcuate section 76051 to be connected to the fourth linear portions L4 of the first wire spring 7601*c* and the second wire spring 7602*c*.

A through portion 4802 through which refrigerant is introduced may be formed through the rear end portion (the back cover 480) of the compression unit 200.

Coupling bosses 4803 to which the coupling rings 7603*c* of the first wire spring 7601*c* and the second wire spring 7602*c* are coupled may be formed around the through portion 4802.

Each of the coupling bosses 4803 may be provided with a fixing member coupling portion 48031 so that the fixing member 8510 can be screwed (see FIG. 8).

A suction cover 850*c* that covers the through portion 4802 and defines a suction flow path 8506 of refrigerant may be provided on the rear end portion of the compression unit 200.

As illustrated in FIG. 25, the suction cover 850*c* may include a cylindrical part 8501 surrounding the through portion 4802 of the back cover 480, a radial section 8502 extending from the cylindrical part 8501 in the radial direction, and a shaft section 8503 extending from the radial section 8502 in the axial direction.

An inlet member 8504 disposed to face the suction pipe 130 of the case 110 may be provided on the suction cover 850*c* (the shaft section 8503).

The suction cover 850*c* may be provided with a coupling boss blocking part 8505 coupled to block a rear end portion of the coupling boss 4803. Although not clearly shown in the drawings, draw-out portions may be formed, as aforementioned, by cutting off the coupling boss blocking parts 8505, so that the first wire spring 7601*c* and the second wire spring 7602*c* can be drawn out, respectively.

Each of the coupling boss blocking parts 8505 may be provided with an insertion hole 8508 formed therethrough such that a fixing member 8510 screwed into the coupling boss 4803 is coupled.

A fixing member coupling portion 8507 to which the fixing member 8510 coupled to the back cover 480 is coupled may be provided in the suction cover 850*c*. An insertion hole 8508 into which the fixing member 8510 is inserted may be formed through the fixing member coupling portion 8507.

On the other hand, as illustrated in FIG. 27, the connecting portion 7605*c* of the wire spring 760*c* may be provided with an anti-rotation section 7606*c* for preventing the first wire spring 7601*c* and the second wire spring 7602*c* from being rotated relative to the case 110. The anti-rotation section 7606*c* may be bent to protrude horizontally with respect to a lengthwise direction of the connecting portion 7605*c*.

The anti-rotation section 7606*c* of the wire spring 760*c* may be supported on the case 110.

The case 110 may be provided with a fixing bracket 790*c* to fixedly support the wire spring 760*c*.

The fixing bracket 790*c* may have, for example, a cross-section in a shape like "U" with one side open.

The fixing bracket 790*c* may include an inner surface portion 7901*c*, an outer surface portion 7902*c* disposed at an outer side of the inner surface portion 7901*c* in a spaced manner, and a connecting end portion 7903*c* connecting the inner surface portion 7901*c* and the outer surface portion 7902*c*.

The fixing bracket 790*c* may be disposed in a manner that its opening faces the front side.

The outer surface portion 7902*c* may be disposed to face the inner surface of the case 110 and the inner surface portion 7901*c* may be disposed above the outer surface portion 7902*c*. The connecting end portion 7903*c* may be disposed toward the rear of the case 110.

A vibration insulating member 780*c* for insulating vibration may be provided between the fixing bracket 790*c* and the connecting portion 7605*c* (the anti-rotation section 7606*c*).

The vibration insulating member 780*c* may be made of, for example, a rubber member. The vibration insulating member 780*c* may be formed in a rectangular parallelepiped shape, for example.

The vibration insulating member 780*c* may surround the anti-rotation section 7606*c* of the connecting portion 7605*c*. The vibration insulating member 780*c* may be manufactured, for example, by injection molding after inserting the anti-rotation section 7606*c* into a mold.

The fixing bracket 790*c* and the vibration insulating member 780*c* may be slidably coupled to each other.

The vibration insulating member 780*c* may be press-fitted into the fixing bracket 790*c*.

An engagement part 800 may be disposed between the vibration insulating member 780*c* and the vibration insulating member coupling part 790*c* to prevent relative movement after coupling.

The engagement part 800 may include a protrusion 8001 protruding from one of contact surfaces between the vibration insulating member 780*c* and the fixing bracket 790*c*, and a protrusion accommodating portion 8002 formed in another one of the contact surfaces to accommodate the protrusion 8001.

The protrusion 8001 may protrude rearward from the rear end portion of the vibration insulating member 780*c* and the protrusion accommodating portion 8002 may be formed through the connecting end portion 7903*c* of the fixing bracket 790*c*.

With this configuration, when the rear support unit 750*c* is to be coupled to the compression unit 200, the coupling ring 7603*c* of the first wire spring 7601*c* and the coupling ring 7603*c* of the second wire spring 7602*c* may be coupled to the coupling bosses 4803, respectively, by interposing the vibration insulating members 770*c* therebetween. The suction cover 850*c* may be coupled to cover an end portion of each coupling boss 4803 by fastening the fixing member 8510.

The vibration insulating member 780*c* of the connecting portion 7605*c* connecting the first wire spring 7601*c* and the second wire spring 7602*c* may be inserted into the fixing bracket 790*c* provided at a center of a lower end in the case 110 in a direction from the front to the rear of the fixing bracket 790*c*.

When the compression unit 200 and the support unit 700*c* are completely coupled to each other, the case 110 may be sealed.

On the other hand, when the operation is started and power is applied to the stator coil 416, the mover 430 may move and the piston 230 may thusly reciprocate along the axial direction.

When the piston 230 moves backward, refrigerant may be introduced into the compression space 220. When the piston 230 moves forward, the refrigerant in the compression space 220 may be compressed.

The refrigerant compressed in the compression space 220 may be introduced into the third discharge space 2823 sequentially via the first discharge space 2821 and the second discharge space 2822 when the discharge valve 217 is opened.

A part of the refrigerant in the third discharge space 2823 may be discharged to the outside of the case 110 through the discharge pipe 135, and another part of the refrigerant in the third discharge space 2823 may flow into the inlet 292 via the first refrigerant moving channel 522 and the second refrigerant moving channel 290. The refrigerant introduced into the inlet 292 may be sprayed into a gap between the inner curved surface of the cylinder 210 and the outer curved surface of the piston 230 through the nozzles 294. Accordingly, friction between the inner curved surface of the cylinder 210 and the outer curved surface of the piston 230 can be reduced.

On the other hand, in the compressor 100*c* according to the implementation, the wire spring of the front support unit and the wire spring 760*c* of the rear support unit 750*c* that are fixedly supported at the position spaced by 180 degrees apart from each other in the circumferential direction of the case 110 can interact with each other, so as to minimize the transfer of the rotational moment generated when the piston 230 moves back and forth to the case 110. Therefore, vibration of the case 110 in the up and down direction due to the rotational moment can be remarkably reduced.

The foregoing description has been given of specific implementations of the present disclosure. However, the present disclosure may be embodied in various forms without departing from the spirit or essential characteristics thereof, and thus the above-described implementations should not be limited by the details of the detailed description.

In addition, even implementations not listed in the detailed description should be interpreted within the scope of the technical idea defined in the appended claims. It is intended that the present disclosure cover the modifications and variations of this invention provided they come within the scope of the appended claims and their equivalents.

What is claimed is:

1. A compressor comprising: a case; a compression unit comprising a cylinder that defines a compression space configured to receive refrigerant, a piston disposed inside the cylinder and configured to reciprocate in the cylinder, and a driver configured to reciprocate the piston in an axial direction; and a support unit that supports the compression unit such that the compression unit is spaced apart from an inner surface of the case, the support unit comprising a first wire spring assembly that includes: a first wire spring and a second wire spring that are symmetrically disposed, each of the first wire spring and the second wire spring having a first end portion connected to the compression unit, and a connecting portion that is supported by the case and connects a second end portion of the first wire spring to a second end portion of the second wire spring, wherein each of the first wire spring and the second wire spring comprises: a plurality of linear portions that extend parallel to one another, and a plurality of curved portions that connect together two adjacent linear portions among the plurality of linear portions, wherein the compressor further comprises: coupling bosses that are disposed at a rear end portion of the compression unit and connected to the first end portion of the first wire spring and the first end portion of the second wire spring, respectively, a suction cover that is disposed at the rear end portion of the compression unit, the suction cover defining a suction flow path configured to guide the refrigerant; and a fixing member that couples the suction cover to the compression unit, wherein the suction cover comprises coupling boss blocking parts coupled to the coupling bosses by the fixing member to thereby prevent the first wire spring and the second wire spring from being unexpectedly separated from the coupling bosses.

2. The compressor of claim 1, wherein the support unit further comprises: coupling rings disposed at the first end portion of the first wire spring and the first end portion of the second wire spring, respectively, each of the coupling rings being coupled to a circumference of one of the coupling bosses; and vibration insulating members configured to reduce transmission of vibration of the coupling bosses to the coupling rings, each of the vibration insulating members being disposed between one of the coupling bosses and one of the coupling rings.

3. The compressor of claim 1, further comprising a suction pipe connected to a circumferential surface of the case and configured to supply the refrigerant to an inside of the case.

4. The compressor of claim 1, wherein the support unit comprises:

a front support that is disposed at a front end portion of the compression unit, the front support comprising a pair of front springs that extend radially outward from the front end portion of the compression unit, that are inclined with respect to the axial direction, and that are configured to expand and contract; and a rear support that is disposed at a rear end portion of the compression unit and includes the first wire spring assembly.

5. The compressor of claim 4, further comprising a fixing bracket that is disposed at an upper end of the inner surface of the case, wherein the connecting portion is fixed to the fixing bracket.

6. The compressor of claim 5, further comprising a vibration insulating member disposed between the fixing bracket and the connecting portion and configured to reduce transmission of vibration.

7. The compressor of claim 6, wherein the vibration insulating member is slidably inserted to the fixing bracket.

8. The compressor of claim 7, wherein at least one of the fixing bracket or the vibration insulating member comprises an engagement part disposed at a contact region between the fixing bracket and the vibration insulating member and configured to restrict movement of the vibration insulating member and the fixing bracket that are coupled to each other.

9. The compressor of claim 8, wherein the fixing bracket has a first contact surface disposed at the contact region, and the vibration insulating member has a second contact surface that is disposed at the contact region and faces the first contact surface, and wherein the engagement part comprises:

a protrusion that protrudes from one of the first contact surface and the second contact surface; and a protrusion accommodating portion that accommodates the protrusion and is defined at the other of the first contact surface and the second contact surface.

10. The compressor of claim 1, wherein the support unit comprises:

a front support disposed at a front end portion of the compression unit; and a rear support disposed at a rear end portion of the compression unit, wherein one of the front support and the rear support includes the first wire spring assembly, and the other of the front support and the rear support includes a second wire spring assembly having a shape corresponding to the first wire spring assembly, and wherein the first wire spring assembly and the second wire spring assembly are fixed at positions offset from each other in a circumferential direction of the case.

11. The compressor of claim 10, wherein the first wire spring assembly and the second wire spring assembly are fixed at the positions offset from each other by 180 degrees in the circumferential direction of the case.

12. The compressor of claim 1, wherein the plurality of linear portions of each of the first wire spring and the second wire spring comprise:

a first linear portion having a first length;

a second linear portion that is disposed at a first side of the first linear portion and extends parallel to the first linear portion, the second linear portion having a second length less than the first length;

a third linear portion that is disposed at a second side of the first linear portion and extends parallel to the first linear portion, the third linear portion having the first length or the second length; and a fourth linear portion that is disposed at a side of the third linear portion and extends parallel to the third linear portion, the fourth linear portion having the second length, and wherein the plurality of curved portions of each of the first wire spring and the second wire spring comprise:

a first curved portion that connects the first linear portion to the second linear portion, a second curved portion that connects the first linear portion to the third linear portion, and a third curved portion that connects the third linear portion to the fourth linear portion.

13. The compressor of claim 12, wherein the second linear portion of each of the first wire spring and the second wire spring comprises a coupling ring coupled to the compression unit, and wherein the connecting portion connects the fourth linear portion of the first wire spring and the fourth linear portion of the second wire spring to each other.

14. The compressor of claim 13, wherein the coupling ring of the first wire spring and the coupling ring of the second wire spring are spaced apart from the connecting portion, and wherein the connecting portion comprises:

an arcuate section having a radius of curvature corresponding to a radius of curvature of the inner surface of the case;

a first bent section that is bent from a first end of the arcuate section and connected to the fourth linear portion of the first wire spring; and a second bent section that is bent from a second end of the arcuate section and connected to the fourth linear portion of the second wire spring.

15. The compressor of claim 14, wherein the plurality of linear portions of each of the first wire spring and the second wire spring are inclined with respect to the a center line passing through a center of the case.

16. The compressor of claim 1, wherein the connecting portion comprises an anti-rotation section that protrudes horizontally and extends in a lengthwise direction of the connecting portion, and wherein the anti-rotation section is supported by the case and configured to restrict rotation of the support unit relative to the case.

17. The compressor of claim 16, further comprising: a fixing bracket that supports the anti-rotation section, and a vibration insulating member disposed between the anti-rotation section and the fixing bracket and configured to reduce transmission of vibration of the anti-rotation section to the fixing bracket.

18. The compressor of claim 1, wherein the driver comprises a stator and a mover, the mover being connected to the piston and configured to reciprocate relative to the stator in the axial direction.

19. The compressor of claim 1, wherein the suction flow path extends from a center of the case toward the inner surface of the case in a radial direction.

* * * * *